(12) United States Patent
Matsukawa et al.

(10) Patent No.: US 12,131,460 B2
(45) Date of Patent: Oct. 29, 2024

(54) IMAGE PROCESSING APPARATUS, IMAGE PROCESSING METHOD, AND INSPECTION APPARATUS

(71) Applicant: NIDEC READ CORPORATION, Kyoto (JP)

(72) Inventors: Toshihide Matsukawa, Kyoto (JP); Kenichi Akasaka, Kyoto (JP); Hironori Nakamura, Kyoto (JP); Masayuki Tsujimoto, Kyoto (JP)

(73) Assignee: NIDEC READ CORPORATION, Kyoto (JP)

( * ) Notice: Subject to any disclaimer, the term of this patent is extended or adjusted under 35 U.S.C. 154(b) by 412 days.

(21) Appl. No.: 17/697,972

(22) Filed: Mar. 18, 2022

(65) Prior Publication Data

US 2022/0301137 A1 Sep. 22, 2022

(30) Foreign Application Priority Data

Mar. 19, 2021 (JP) ................. 2021-046200

(51) Int. Cl.
*G06T 7/00* (2017.01)
*G06T 5/70* (2024.01)

(52) U.S. Cl.
CPC ............. *G06T 7/001* (2013.01); *G06T 5/70* (2024.01); *G06T 2207/30108* (2013.01)

(58) Field of Classification Search
CPC . G06T 7/001; G06T 5/70; G06T 2207/30108; G06T 2207/30148; G06T 7/11; G06T 7/0008; G06T 7/155; G06T 7/73; G06T 7/70; G06T 7/13; G06T 7/66; G06T 11/203; G06T 2207/10016; G06T 2207/10024; G06T 2207/20084; G06T 2207/30141; G06T 3/4046; G06T 7/0006; G06T 7/0004; G06T 7/136; G06T 7/90; G06T 9/002; G06T 11/006; G06T 17/05; G06T 17/20; G06T 2207/30132;
(Continued)

(56) References Cited

U.S. PATENT DOCUMENTS

| 6,542,630 B1 * | 4/2003 | Sherwood ............. G06T 7/0006 348/87 |
| 2002/0054209 A1 * | 5/2002 | Obi ........................ H04N 7/18 348/95 |

(Continued)

FOREIGN PATENT DOCUMENTS

JP 2018200314 A1 12/2018

*Primary Examiner* — Nimesh Patel
(74) *Attorney, Agent, or Firm* — VIERING, JENTSCHURA & PARTNER MBB

(57) ABSTRACT

An image processing unit including: a pad region extraction unit that executes pad region extraction processing of extracting a substantially rectangular pad region surrounding a plurality of pads from an image of an inspection target object; an imaginary straight line setting unit that executes imaginary straight line setting processing of setting an imaginary first straight line parallel to a side extending in an X direction of the pad region and setting an imaginary second straight line parallel to a side extending in a Y direction of the pad; and a reference point setting unit that executes reference point setting processing of setting an intersection between the first straight line and the second straight line as the reference point.

19 Claims, 18 Drawing Sheets

(58) Field of Classification Search
CPC ... G06T 2211/424; G06T 7/0012; G06T 7/74; G06T 11/40; G06T 15/04; G06T 2207/10056; G06T 2207/10068; G06T 2207/10081; G06T 2207/10088; G06T 2207/10104; G06T 2207/10108; G06T 2207/10116; G06T 2207/10132; G06T 2207/20221; G06T 2207/30152; G06T 5/50; G06T 7/00; G06T 7/32; G06T 7/33; G06T 1/0007; G06T 15/00; G06T 15/005; G06T 15/40; G06T 15/405; G06T 7/0002; G06T 7/521; G06T 7/571; G06T 9/00; G06T 9/001; G06V 10/10; G06V 10/22; G06V 10/40; G06V 10/44; G06V 10/56; G06V 10/82; G06V 2201/07; B24B 37/34; B24B 37/16; B24B 37/20; B24B 37/22; G06F 1/184; G06F 1/185; G06F 1/16; G06F 11/30; G06F 11/22; G06F 3/0414; G06F 40/20; G06F 3/0395; G06F 2203/04802; G06F 2203/04102; G06F 1/1684; G06F 1/1656; G06F 2200/1614; H01L 22/00; H01L 22/12; H01L 22/20; H01L 2223/54426; H01L 2223/54473; H01L 2223/5448; H01L 2224/05001; H01L 2224/05008; H01L 2224/05026; H01L 2224/06135; H01L 21/67253; H01L 2224/2405; H01L 2224/829; H01L 23/13; H01L 2924/14; H01L 2924/15153; H01L 2924/1815; H01L 23/5389; H01L 24/06; H01L 23/49838; H01L 2924/00012; G01N 21/956; G01N 2021/95638; G01N 21/95684; G01N 21/954; G01N 2021/95669; G01N 21/88; G01N 21/8803; G01N 21/8851; G01N 2223/6113; G01N 23/18; H05K 1/0269; H05K 3/1216; H05K 13/0817; H05K 13/082; H05K 13/08; H05K 13/083; H05K 2201/09427; H05K 3/3442; H05K 1/0266; H05K 13/0815; H05K 3/0005; B23K 15/0013; B23K 15/0093; B23K 15/0046; B23K 15/02; B23K 31/12

See application file for complete search history.

(56) References Cited

U.S. PATENT DOCUMENTS

| | | | | |
|---|---|---|---|---|
| 2004/0081349 | A1* | 4/2004 | Chaya | G01R 31/311 |
| | | | | 382/145 |
| 2017/0357847 | A1* | 12/2017 | Jabri | G06T 7/73 |
| 2023/0115469 | A1* | 4/2023 | Matsukawa | G01S 17/04 |
| | | | | 324/763.01 |

* cited by examiner

IMAGE PROCESSING APPARATUS, IMAGE PROCESSING METHOD, AND INSPECTION APPARATUS

CROSS-REFERENCE TO RELATED APPLICATIONS

This application claims priority under 35 U.S.C. § 119 to Japanese Patent Application No. 2021-046200 filed on Mar. 19, 2021, the entire content of which is incorporated herein by reference.

FIELD

Various embodiments of the present disclosure relate to an image processing apparatus and an image processing method that set a positioning reference point by image processing, and an inspection apparatus using the same.

BACKGROUND

Conventionally, there has been known a substrate inspection apparatus in which a CCD camera for detecting a position of a mark on a substrate having the mark is arranged, a calculation unit for calculating a positional deviation amount and an inclination amount of a circuit pattern from positions of at least two marks detected by the CCD camera is provided, and a control unit for actuating a positioning mechanism according to the positional deviation amount and the inclination amount is provided.

In order to provide a mark on a substrate, it is necessary to secure a space for providing the mark on the substrate. On the other hand, in recent years, pad arrangement has become highly dense, and it has become difficult to secure a space for providing a mark on a component on which the pad is arranged. Therefore, there is a need to position the substrate without providing a mark for positioning on the substrate.

SUMMARY

An image processing apparatus according to one example of the present disclosure is an image processing apparatus that sets a positioning reference point with respect to an inspection target object in which a plurality of pad rows in which a plurality of pads line up along a first direction are formed side by side in a second direction intersecting the first direction, the image processing apparatus including: a pad region extraction unit that executes pad region extraction processing of extracting a substantially rectangular pad region surrounding the plurality of pads from an image of the inspection target object; an imaginary straight line setting unit that executes imaginary straight line setting processing of setting an imaginary first straight line parallel to a side extending in the first direction of the pad region and setting an imaginary second straight line parallel to a side extending in the second direction; and a reference point setting unit that executes reference point setting processing of setting an intersection between the first straight line and the second straight line as the reference point.

An inspection apparatus according to one example of the present disclosure positions the inspection target object using the reference point set by the above-described image processing apparatus.

An image processing method according to one example of the present disclosure is an image processing method for setting a positioning reference point with respect to an inspection target object in which a plurality of pad rows in which a plurality of pads line up along a first direction are formed side by side in a second direction intersecting the first direction, the image processing method including: pad region extraction processing of extracting a substantially rectangular pad region surrounding the plurality of pad rows from an image of the inspection target object; imaginary straight line setting processing of setting an imaginary first straight line parallel to a side extending in the first direction of the pad region and setting an imaginary second straight line parallel to a side extending in the second direction; and reference point setting processing of setting an intersection between the first straight line and the second straight line as the reference point.

The above and other elements, features, steps, characteristics and advantages of the present disclosure will become more apparent from the following detailed description of the preferred embodiments with reference to the attached drawings.

DETAILED DESCRIPTION

Figure 1:
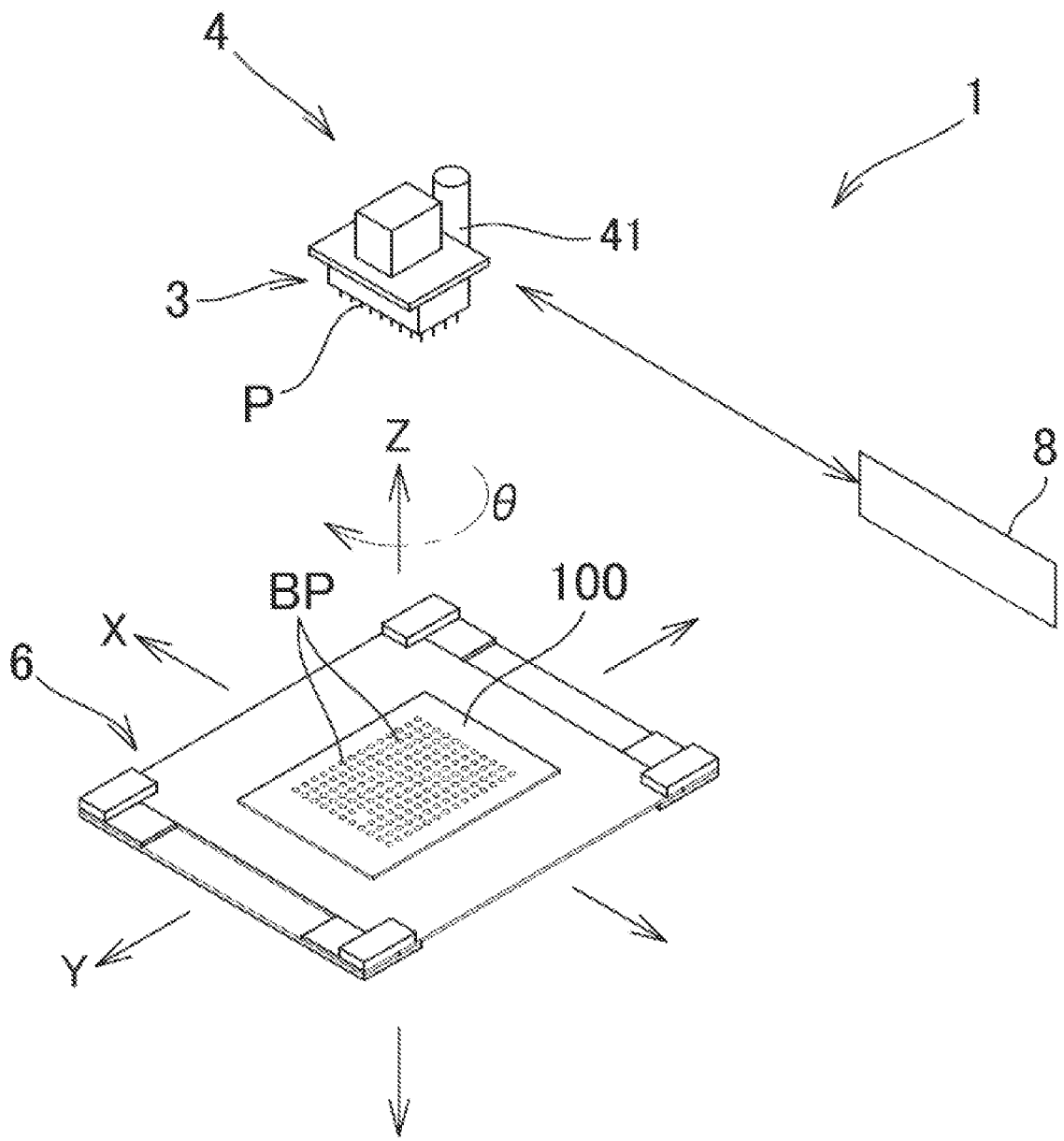
FIG. 1 is an explanatory diagram conceptually showing a schematic configuration of an inspection apparatus 1 including an image processing apparatus according to an embodiment of the present disclosure.
Figure 2:
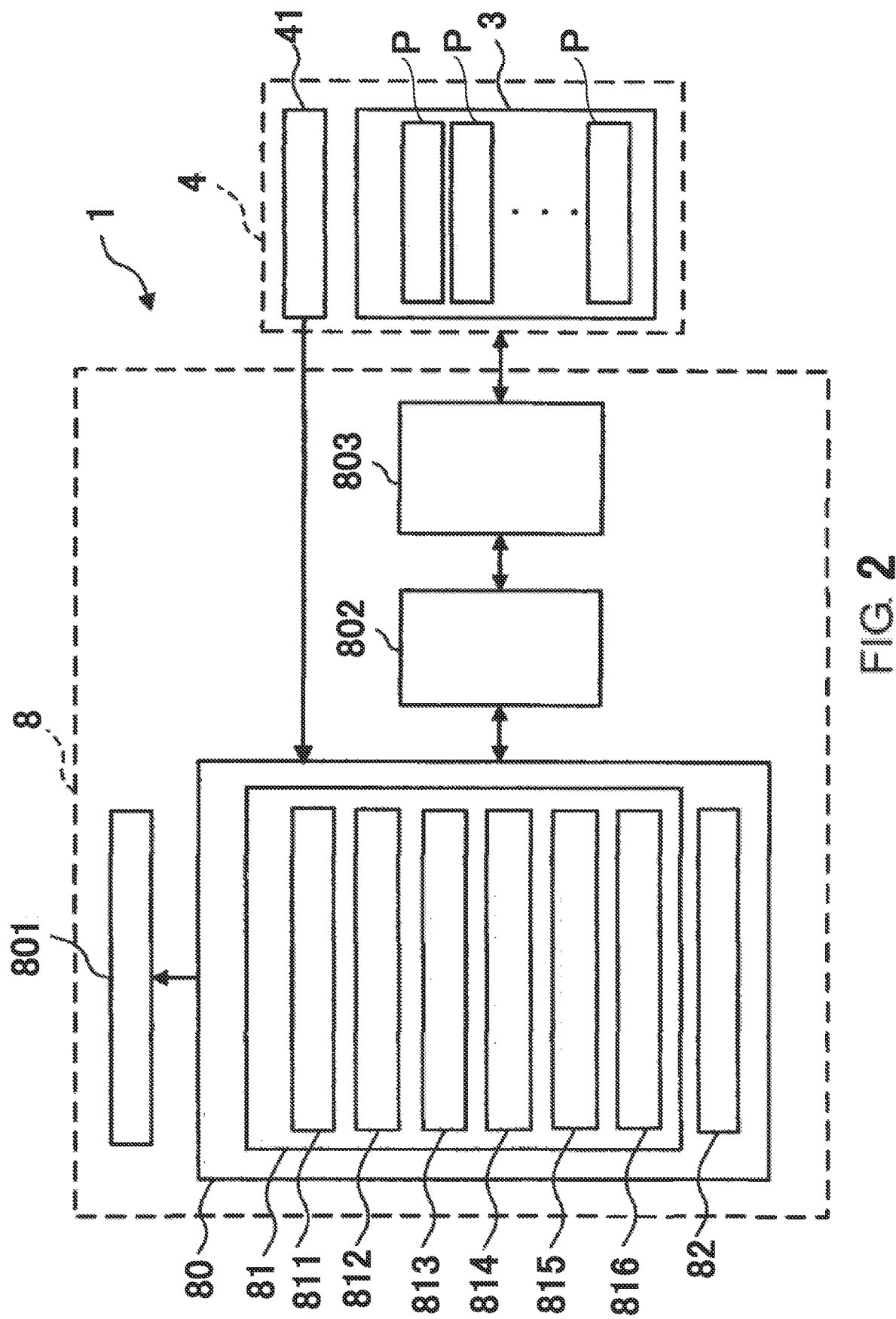
FIG. 2 is a block diagram mainly showing an example of an electrical configuration of the inspection apparatus 1 shown in FIG. 1.

An embodiment of the present disclosure will be described below with reference to drawings. Note that components given the same reference numerals in the drawings are identical, and the description thereof is omitted. The inspection apparatus 1 shown in FIGS. 1 and 2 is an apparatus that inspects an internal wiring circuit formed in the inspection target object 100, which is an example of an inspection target.

The inspection target object 100 may be, for example, an interposer, a semiconductor wafer, a semiconductor package, a semiconductor substrate, a film carrier, a printed wiring board, a flexible substrate, a ceramic multilayer wiring board, an electrode plate for a display such as a liquid crystal display, or the like.

Figure 3:
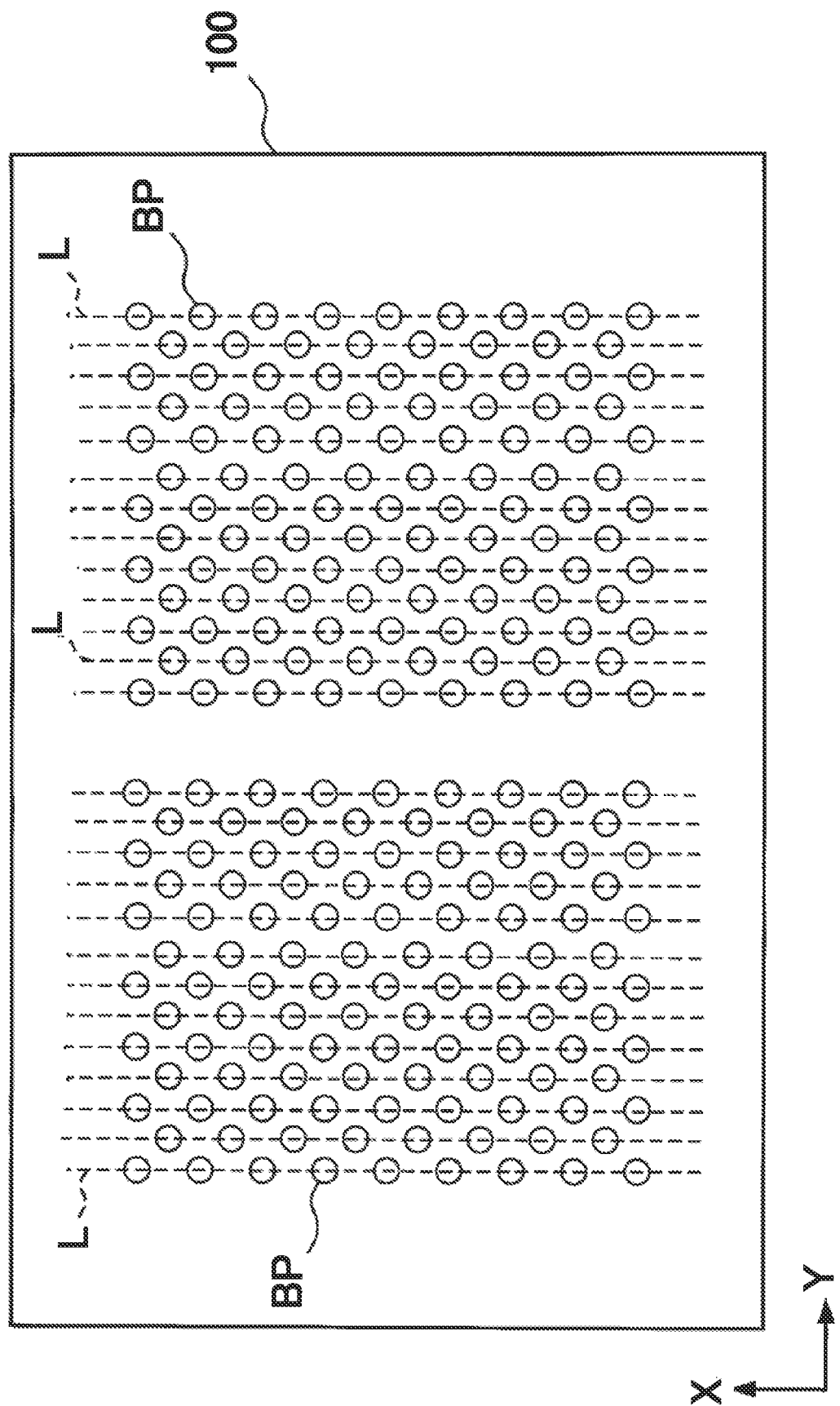
FIG. 3 is an enlarged explanatory view showing an inspection target object 100 shown in FIG. 1.

With reference to FIG. 3, in the inspection target object 100, a plurality of pad rows L in which a plurality of pads BP of the inspection target line up along an X direction (first direction) are formed side by side in a Y direction (second direction) orthogonal to the X direction. The pad BP may be, for example, a three-dimensionally protruding bump or a planar electrode.

In addition to the pad BP to be inspected, a pad, a pattern, and the like that are not inspection targets having a size, a shape, and the like different from those of the pad BP may be formed on the inspection target object 100. In the following description, as an example, a case where the pad BP is a bump is described.

The pad row L is only required to include at least three pads BP, and the number of the pad rows L is only required to be at least three. That is, the number of pads BP is only required to be 3×3=9 or more. When the pad row L includes three or more pads BP and the number of pad row L is three or more, the first straight line VL1 and the second straight line VL2 described later can each be set based on three or more pads BP.

The inspection apparatus 1 shown in FIG. 1 generally includes an inspection mechanism 4, a fixing device 6, and an inspection unit 8. The fixing device 6 is configured to fix the inspection target object 100, which is the inspection target, at a predetermined position. The fixing device 6 may be configured to convey the inspection target object 100 to an inspection position by sliding. The inspection mechanism 4 includes an inspection jig 3 and the image-capturing unit 41. The image-capturing unit 41 is directly or indirectly attached to the inspection jig 3.

The inspection mechanism 4 supports the inspection jig 3 and the image-capturing unit 41 above the fixing device 6. The inspection target object 100 held by the fixing device 6 is movable in three axial directions of X, Y, and Z orthogonal to one another by a drive mechanism 801, and is rotatable about a Z axis. FIG. 1 shows an example in which the up-down direction is the Z axis.

In the inspection mechanism 4, the inspection jig 3 for inspecting an internal wiring circuit formed in the inspection target object 100 is detachably disposed.

The image-capturing unit 41 is a camera configured by using, for example, a charge coupled device (CCD) or a complementary metal oxide semiconductor (CMOS) image-capturing element. The image-capturing unit 41 captures an image of the surface of the inspection target object 100. The image captured by the image-capturing unit 41 is output to a control unit 80 of the inspection unit 8.

The image-capturing unit 41 is attached to the inspection jig 3. Therefore, based on an image captured by the image-capturing unit 41, it is possible to obtain the relative positional relationship between the inspection jig 3 and the inspection target object 100 and the inclination (rotation angle about the Z axis) of the inspection jig 3 with respect to the inspection target object 100.

The inspection jig 3 includes a plurality of probes P. A rear end of each probe P is electrically connected to the inspection unit 8. The plurality of probes P are arranged in the same manner as the arrangement of the plurality of pads BP. Therefore, appropriate positioning of the inspection jig 3 and the inspection target object 100 enables the probes P to be brought into contact with the respective pads BP.

With reference to FIG. 2, the inspection unit 8 includes, for example, the control unit 80, the drive mechanism 801, a measurement unit 802, and a scanner unit 803. The drive mechanism 801 is configured by using, for example, a motor, a gear mechanism, or the like. The drive mechanism 801 moves the inspection target object 100 in the three axial directions of X, Y, and Z in response to a control signal from the control unit 80, and rotates the inspection target object about the Z axis.

The drive mechanism 801 is not limited to one that moves and rotates the inspection target object 100. The drive mechanism 801 may relatively move and rotate the inspection jig 3 and the inspection target object 100 by moving and rotating the inspection jig 3 and the image-capturing unit 41, for example. Alternatively, the drive mechanism 801 may move and rotate both the inspection jig 3 and the inspection target object 100.

The scanner unit 803 is a switching circuit configured by using a switching element such as a semiconductor switch or a relay switch. In response to a control signal from the control unit 80, the scanner unit 803 electrically connects the probe selected from the plurality of probes P to the measurement unit 802.

The measurement unit 802 includes, for example, a power supply circuit, a voltmeter, an ammeter, and the like. The measurement unit 802 supplies current between the pair of probes selected by the scanner unit 803, measures the current flowing between the probes and the voltage generated between the probes, and outputs the measurement value to the control unit 80.

The control unit 80 is, for example, a so-called microcomputer configured to include a central processing unit (CPU) that executes predetermined arithmetic processing, a random access memory (RAM) that temporarily stores data, a nonvolatile storage device that stores a predetermined control program and the like, and peripheral circuits thereof.

The control unit 80 functions as an image processing unit 81 (image processing apparatus) and an inspection processing unit 82, for example, by executing a predetermined control program. The image processing unit 81 includes a binarization unit 811, a sorting unit 812, a noise reduction unit 813, a pad region extraction unit 814, an imaginary straight line setting unit 815, and a reference point setting unit 816.

The image processing unit 81 corresponds to an example of the image processing apparatus. Note that the image processing unit 81 is not limited to the example of being provided in the inspection apparatus 1. The image processing unit 81 may be configured as an independent image processing apparatus, or may be incorporated in an apparatus other than the inspection apparatus.

The binarization unit 811 executes binarization processing of binarizing the image of the inspection target object 100 captured by the image-capturing unit 41. The sorting unit 812 executes sorting processing of sorting images of the plurality of pads BP by pattern matching. The noise reduction unit 813 executes noise reduction processing of reducing noise near the center portion in the image of the pad BP captured by the image-capturing unit 41.

The pad region extraction unit 814 executes pad region extraction processing of extracting the substantially rectangular pad region BA surrounding the plurality of pad rows L from the image of the inspection target object 100 captured by the image-capturing unit 41. The imaginary straight line setting unit 815 executes imaginary straight line setting processing of setting the imaginary first straight line VL1 along the side extending in the X direction (first direction) of the pad region BA and setting the imaginary second straight line VL2 along the side extending in the Y direction (second direction).

The reference point setting unit 816 executes reference point setting processing of setting the intersection of the first straight line VL1 and the second straight line VL2 as the reference point RP.

Based on the reference point RP set by the reference point setting unit 816, the inspection processing unit 82 calculates the relative positional relationship and inclination between the inspection jig 3 and the inspection target object 100 from the position of the reference point RP in the image of the inspection target object 100 captured by the image-capturing unit 41. Then, the inspection processing unit 82 causes the drive mechanism 801 to move the inspection target object 100 to position the inspection jig 3 with respect to the inspection target object 100 so that the drive mechanism 801 causes the probe P to be correctly brought into contact with each pad BP of the inspection target object 100.

The inspection processing unit 82 positions the inspection target object 100 with respect to the inspection jig 3, and causes the measurement unit 802 and the scanner unit 803 to measure the presence or absence of conduction, the resistance value, and the like between the respective pads BP of the inspection target object 100 via the respective probes P in a state where the respective probes P are brought into contact with the respective pads BP of the inspection target object 100. The inspection processing unit 82 executes inspection of the inspection target object 100 based on the measurement result of the measurement unit 802.

Figure 4:
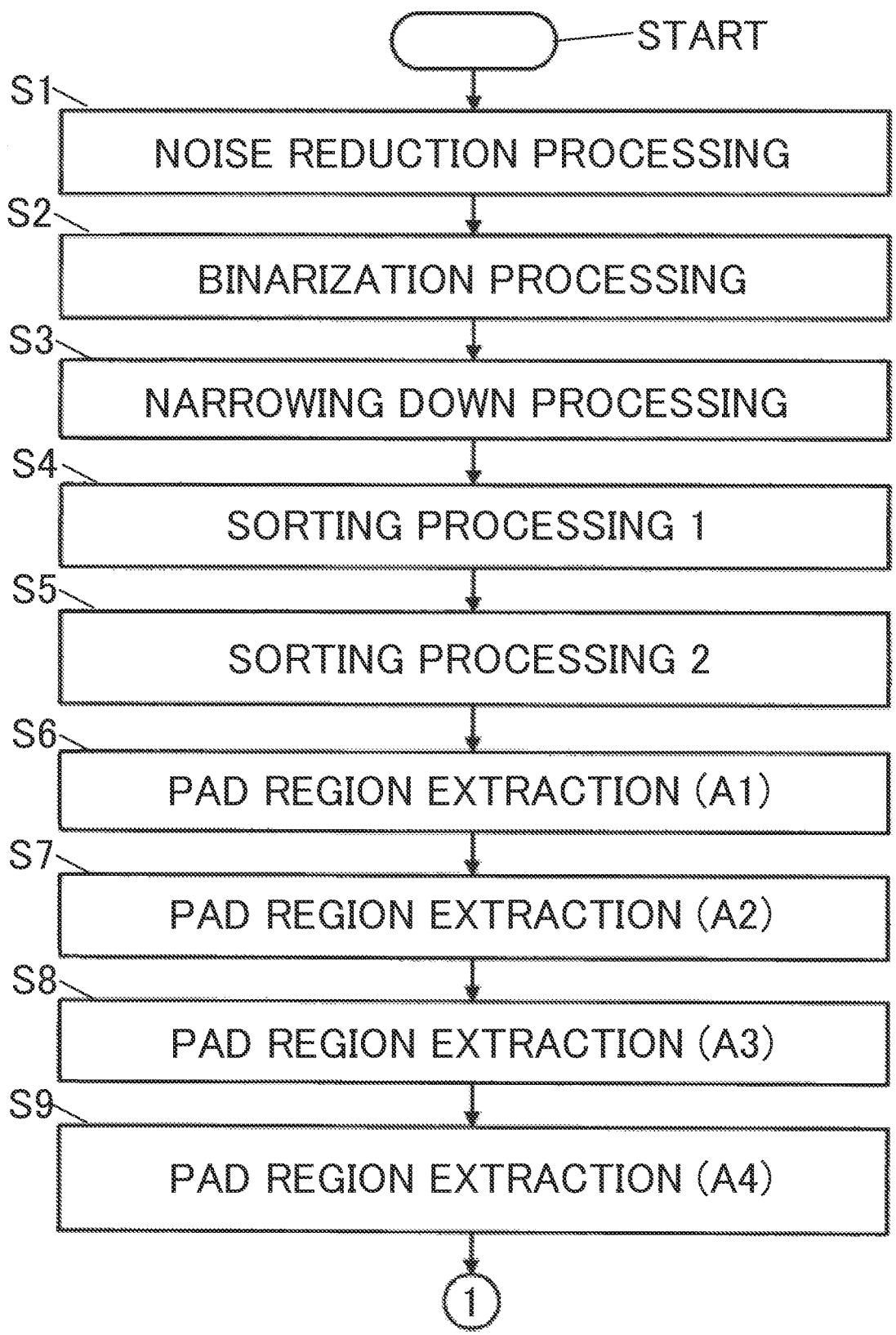
FIG. 4 is a flowchart showing an example of noise reduction processing, binarization processing, narrowing down processing, sorting processing 1 and 2, and pad region extraction processing (A1) to (A4)

Next, an operation of the image processing unit 81 using the image processing method according to an embodiment of the present disclosure will be described. With reference to FIG. 4, first, the noise reduction unit 813 reduces noise near the center portion in the image of the pad BP with respect to the image G1 of the inspection target object 100 captured by the image-capturing unit 41 (step S1: noise reduction processing).

Note that the image processing unit 81 does not necessarily have to be the processing target of the entire image captured by the image-capturing unit 41. For example, of the entire image region captured by the image-capturing unit 41, a region where the pad BP that becomes the inspection target is assumed to be arranged may be partially extracted as the image G1 of the processing target.

The noise reduction processing (step S1) does not necessarily have to be executed. The noise reduction processing (step S1) may be executed after the binarization processing (step S2) and before the narrowing down processing (step S3). The noise reduction processing (step S1) may be executed after the narrowing down processing (step S3) and before the sorting processing 1 and 2 (steps S4 and S5). The noise reduction processing (step S1) may be executed after the sorting processing 1 and 2 (steps S4 and S5) and before the pad region extraction processing (steps S6 to S12). The noise reduction processing (step S1) may be executed after the pad region extraction processing (steps S6 to S12) and before the imaginary straight line setting processing (steps S13 and S14). Alternatively, steps S4 and S5 may be executed after the imaginary straight line setting processing (steps S13 and S14) and before the reference point setting processing (step S15).

Figure 6:
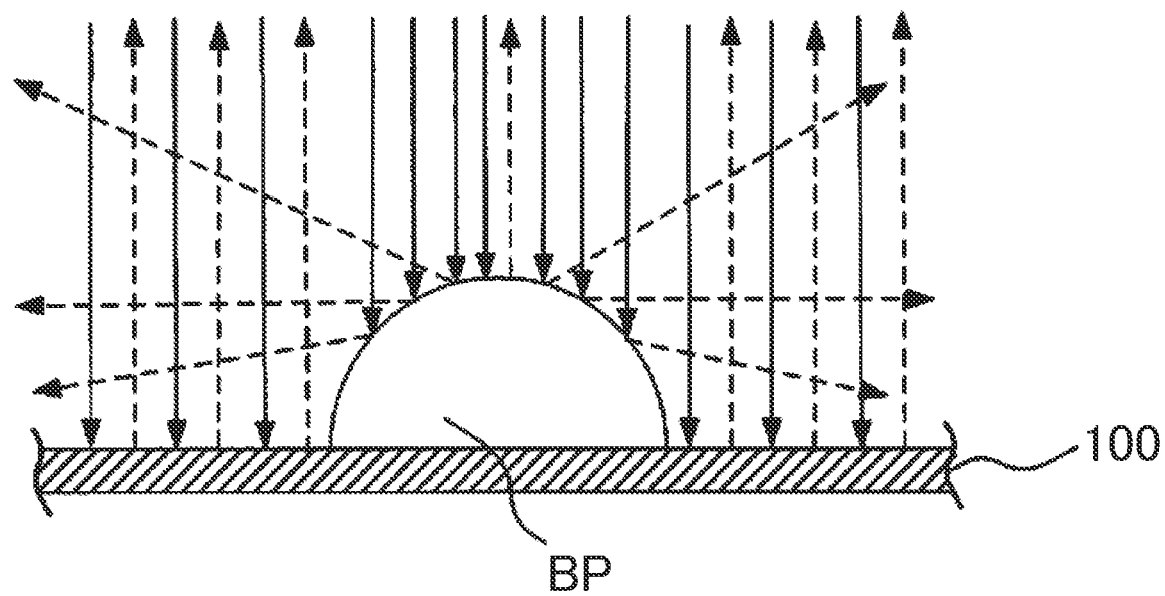
FIG. 6 is an explanatory diagram for explaining a case where illumination light is emitted in parallel with an optical axis of an image-capturing unit 41 and image capturing is performed by the image-capturing unit 41.
Figure 8:
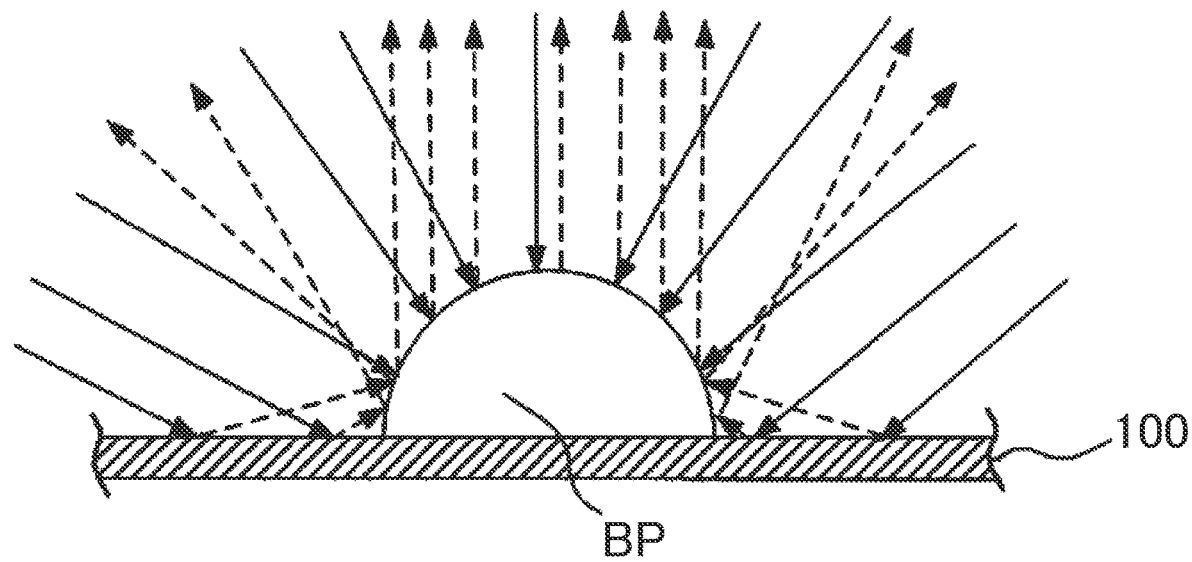
FIG. 8 is an explanatory diagram for explaining a case where image capturing is performed by the image-capturing unit 41 in a case where a pad BP is obliquely irradiated with illumination light.

The image G1 captured by the image-capturing unit 41 represents, with shading, the intensity of reflected light that has been applied to and reflected by the inspection target object 100. Therefore, even if each pad BP formed on the inspection target object 100 actually has a circular shape as shown in FIG. 3, the contour of the pad BP does not necessarily have a clear circular shape as shown in FIG. 3 in the image G1 captured by the image-capturing unit 41. In FIG. 6 and FIG. 8 described later, illumination light is indicated by a solid arrow, and reflected light is indicated by a broken arrow.

With reference to FIG. 6, the pad BP protrudes in a substantially dome shape from the substrate surface of the inspection target object 100. Therefore, for example, in a case where the illumination light is applied in parallel with the optical axis of the image-capturing unit 41, that is, perpendicularly to the substrate surface of the inspection target object 100, the light reflected by the substrate surface is received by the image-capturing unit 41 as it is, and the light applied to the side surface of the pad BP is reflected in an oblique direction by the inclination of a slope of the pad BP. As a result, in the image G1 captured by the image-capturing unit 41, as shown in FIG. 7, the reflected light from the substrate surface of the inspection target object 100 is so strong that the image of the substrate surface becomes white.

On the other hand, the light applied to the side surface of the pad BP is not received by the image-capturing unit 41, or a part of the irregularly reflected light is received by the image-capturing unit 41. Therefore, the image of the side surface of the pad BP becomes black or gray. In FIG. 7, a part where the image becomes black or gray is hatched. Near the top of the pad BP, the illumination light is applied to the pad BP surface substantially perpendicularly, the illumination light is strongly reflected from near the top of the pad BP, and the image near the top of the pad BP becomes white in the image G1. Hereinafter, for ease of explanation, as shown in FIG. 7, the image G1 will be described by exemplifying a case where the image of the pad BP is black or gray and the image around the pad BP is white.

Figure 7:
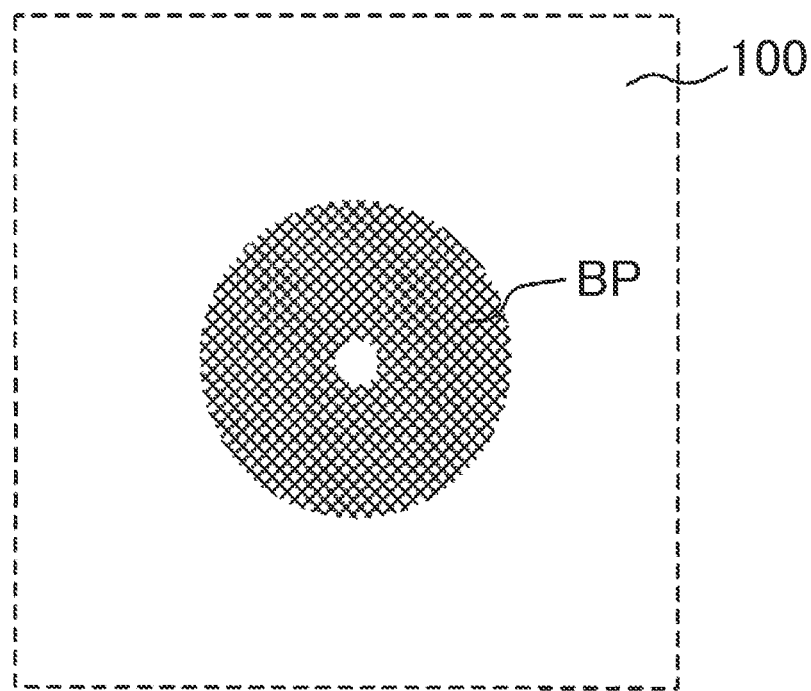
FIG. 7 is an explanatory diagram showing an example of an image G1 captured by the image-capturing unit 41 in a case where illumination light is emitted in parallel with an optical axis of the image-capturing unit 41.

As shown in FIG. 7, when the image near the top of the black pad BP becomes white due to the reflected light, a white part of the image near the top becomes noise. Therefore, the image of the pad BP in which such noise is generated is liable to be reduced in accuracy of being recognized as the circular pad BP in the sorting processing described later. Therefore, in step S1, reduction of the noise generated due to the strong reflection near the center portion in the image of the pad BP improves the recognition accuracy of the pad BP in the sorting processing described later, the calculation accuracy of the center coordinates of the pad BP in the imaginary straight line setting processing, and the like.

As a method for reducing noise, various image processing methods for noise reduction can be used. For example, it is possible to use a method in which a white part generated by strong reflection is extracted from the image G1, the extracted white part is binarized, the binarized white part is expanded, the expanded white part is filled with gray set in advance, and then a smoothing filter is applied to the entire image G1.

Figure 9:
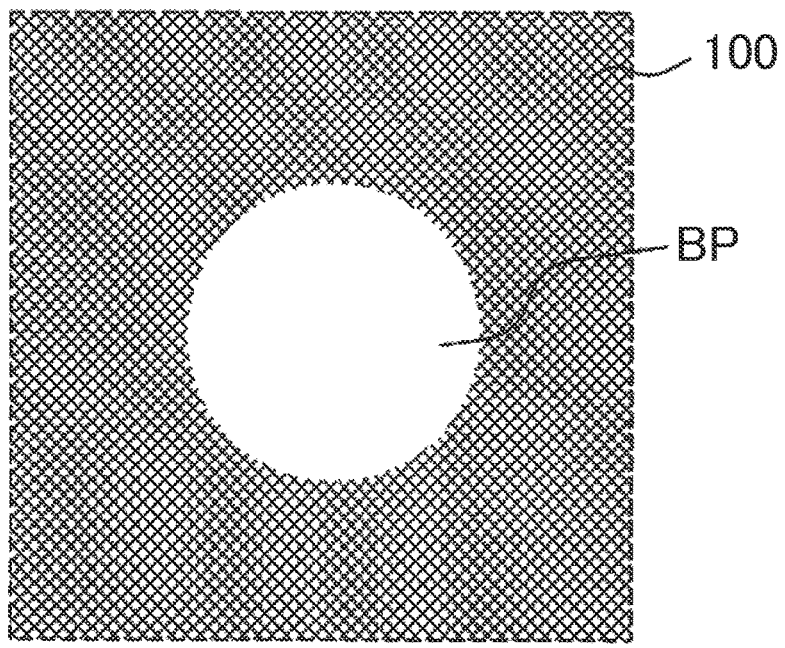
FIG. 9 is an explanatory diagram showing an example of the image G1 captured by the image-capturing unit 41 in a case where the pad BP is obliquely irradiated with illumination light.

Note that, in a case where the image G1 is an image in which the substrate surface is black and the pad BP is white or gray as shown in FIG. 9, the noise reduction processing in step S1 needs not be executed, and the image processing unit 81 needs not be included the noise reduction unit 813.

Next, the binarization unit 811 generates an image G2 by binarizing the image G1 whose noise has been reduced in step S1 (step S2: binarization processing).

For example, as shown in FIG. 7, in a case of an image where the pad BP is black or gray and the periphery of the pad BP is white, by binarizing the image G1 with an appropriate threshold, the gray part of the pad BP can be blackened and the contrast with the white substrate surface around the pad BP can be clarified. On the other hand, for example, as shown in FIG. 9, in a case of an image where the pad BP is white or gray and the periphery of the pad BP is black, by binarizing the image G1 with an appropriate threshold, the gray part of the pad BP can be whitened and the contrast with the black substrate surface around the pad BP can be clarified.

By clarifying the contrast between the pad BP and the substrate surface around the pad BP, the recognition accuracy of the pad BP in the sorting processing described later, the calculation accuracy of the center coordinates of the pad BP in the imaginary straight line setting processing, and the like are improved, and eventually, the setting accuracy of the reference point in the reference point setting processing described later is improved.

Note that the binarization processing (step S2) does not necessarily have to be executed. The binarization processing (step S2) may be executed after the narrowing down processing (step S3) and before the sorting processing 1 and 2 (steps S4 and S5). The binarization processing (step S2) may be executed after the sorting processing 1 and 2 (steps S4 and S5) and before the pad region extraction processing (steps S6 to S12). The binarization processing (step S2) may be executed after the pad region extraction processing (steps S6 to S12) and before the imaginary straight line setting processing (steps S13 and S14). Alternatively, the binarization processing (step S2) may be executed after the imaginary straight line setting processing (steps S13 and S14) and before the reference point setting processing (step S15).

Next, as preprocessing of the sorting processing, the sorting unit 812 narrows down a search region for searching for an image of the pad BP for which pattern matching is performed (step S3: narrowing down processing). Various types of image processing such as binarization processing and morphology processing of the pad BP image can be used to narrow down the search region. This makes it possible to narrow the region where the pattern matching is performed, prevent erroneous recognition of the pattern matching, and shorten the time of the sorting processing. Step S3 may be omitted.

Next, the sorting unit 812 sorts the images of the plurality of pads BP by pattern matching in the region of the image G2 narrowed down in step S3 (step S4: sorting processing 1).

Figure 11:
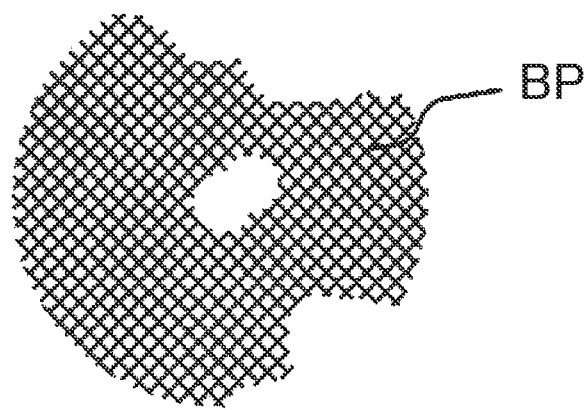
FIG. 11 is an explanatory diagram showing an example of an image of the pad BP in an image G2.

The surface of the pad BP may be uneven or deformed. In a case where the probe P has ever been brought into contact with the pad BP, there is a case where the surface of the pad BP has a probe mark. In such a case, the image of the pad BP in the image G2 does not become circular, and as shown in FIG. 11, for example, the shape may be lost.

Therefore, by pattern matching with a reference image of the pad BP set in advance, e.g., a circular image, the sorting unit 812 sorts the image of the pad BP that gives a good image shape. The image of the pad BP selected by the sorting processing is recognized by the image processing unit 81 as the image of the pad BP used for setting the reference point.

Next, the sorting unit 812 sorts an image likely to be a pad using the pad radius, roundness, and an area value from among the images of the pad BP sorted in the sorting processing 1 in step S4 (step S5: sorting processing 2).

In the sorting by pattern matching in step S4, there is a risk of erroneously sorting a pad that is not an inspection target or the like having a size different from that of the pad BP. Therefore, by executing the sorting processing 2 of step S5 in addition to the sorting processing 1 of step S4 as the sorting processing, it is possible to improve the sorting accuracy of the pad BP.

Figure 10:
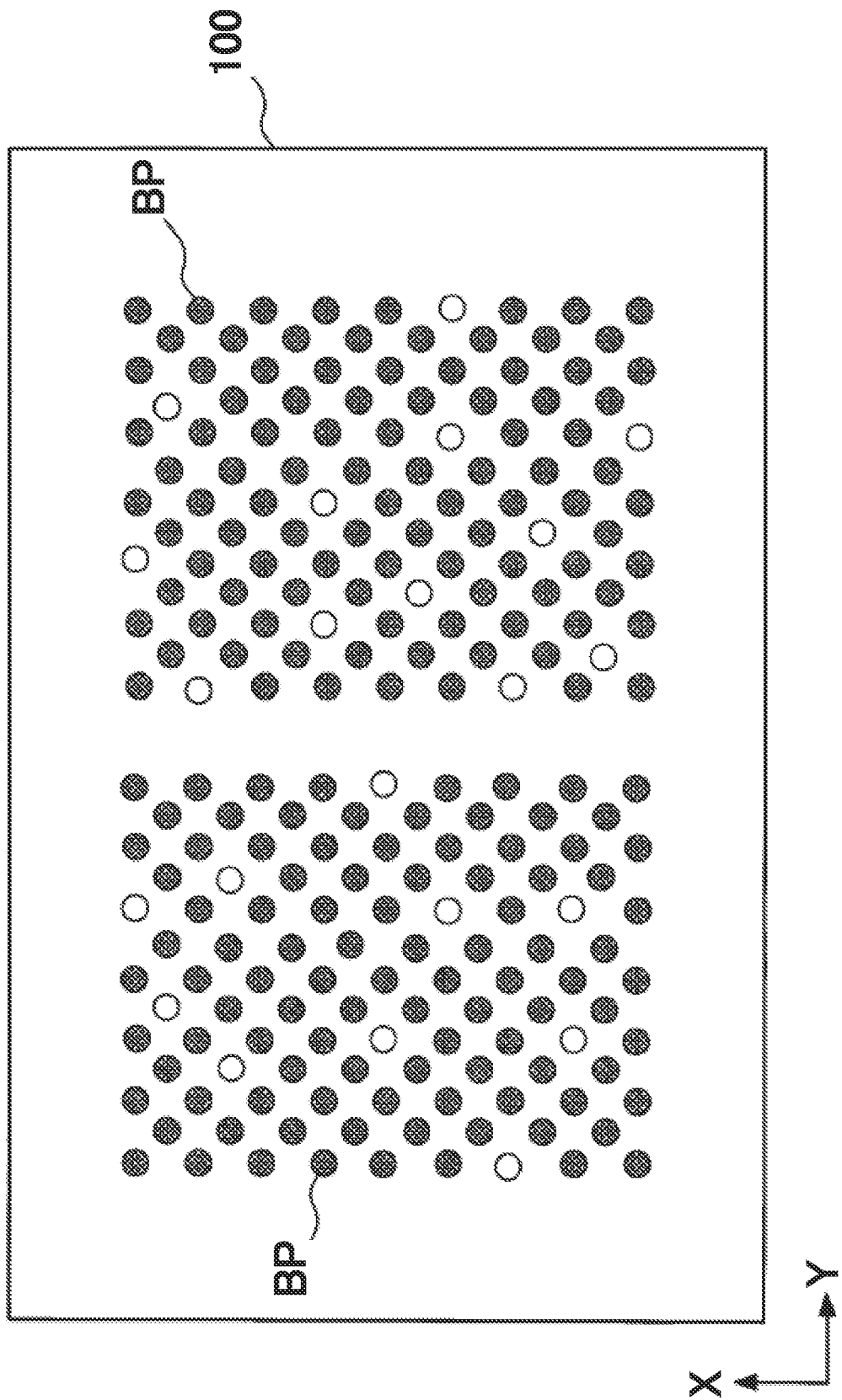
FIG. 10 is an explanatory diagram showing an example of an image of the pad BP sorted by the sorting processing 1 and 2.

In FIG. 10, the sorted pad BP is hatched. According to the sorting processing 1 and 2 of steps S4 and S5, it is possible to exclude the pad BP that is not suitable for setting of the reference point due to loss of the shape, a pad and a pattern that are not inspection targets, other dirt, noise, and the like from the pad BP used for setting of the reference point. This results in improvement of the calculation accuracy of the center coordinates of the pad BP in the imaginary straight line setting processing described later, and improvement of the setting accuracy of the reference point in the reference point setting processing described later.

Note that the sorting processing 1 and 2 in steps S4 and S5 are not necessarily executed as the sorting processing, and only the sorting processing 1 in step S4 may be executed. Steps S4 and S5 need not be executed. The sorting processing (steps S4 and S5) may be executed after the pad region extraction processing (steps S6 to S12) and before the imaginary straight line setting processing (steps S13 and S14). Alternatively, the sorting processing (steps S4 and S5) may be executed after the imaginary straight line setting processing (steps S13 and S14) and before the reference point setting processing (step S15).

Figure 12:
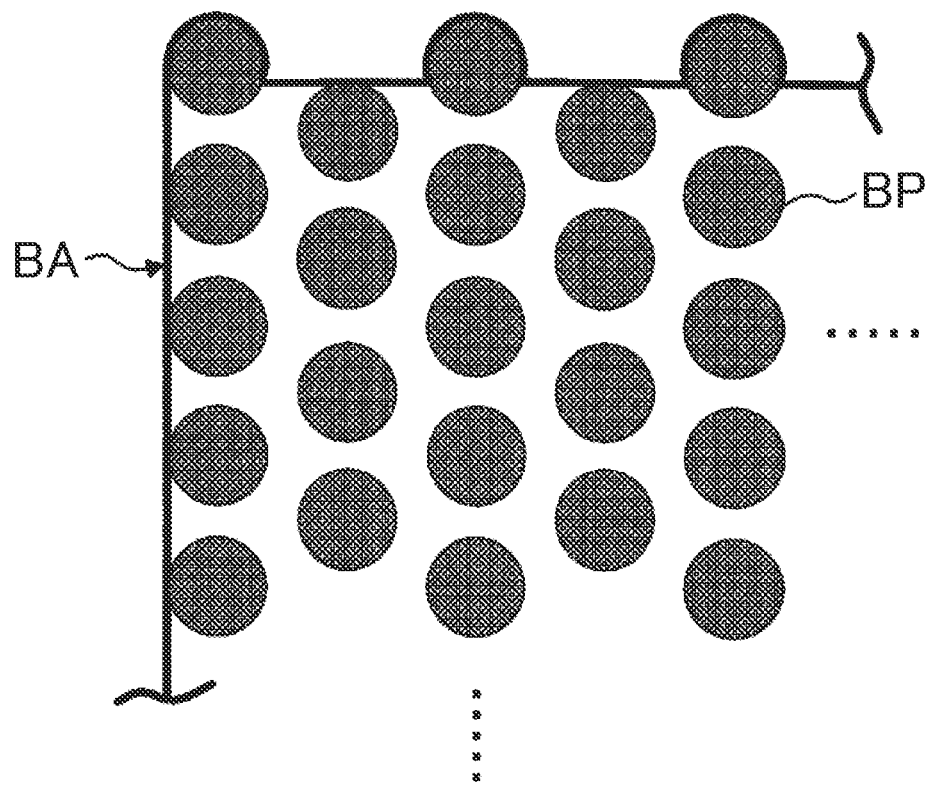
FIG. 12 is an explanatory diagram for explaining pad region extraction processing (A1)

Next, the pad region extraction unit 814 sets one or a plurality of pad regions BA having a substantially rectangular shape surrounding the images of the plurality of pads BP sorted by the sorting processing from the image G2 (step S6: pad region extraction processing (A1)). For example, the pad region extraction unit 814 sets the pad region BA surrounded by a boundary line as shown in FIG. 12 by executing closing processing and filling processing on the image of pad BP sorted by the sorting processing.

Figure 13:
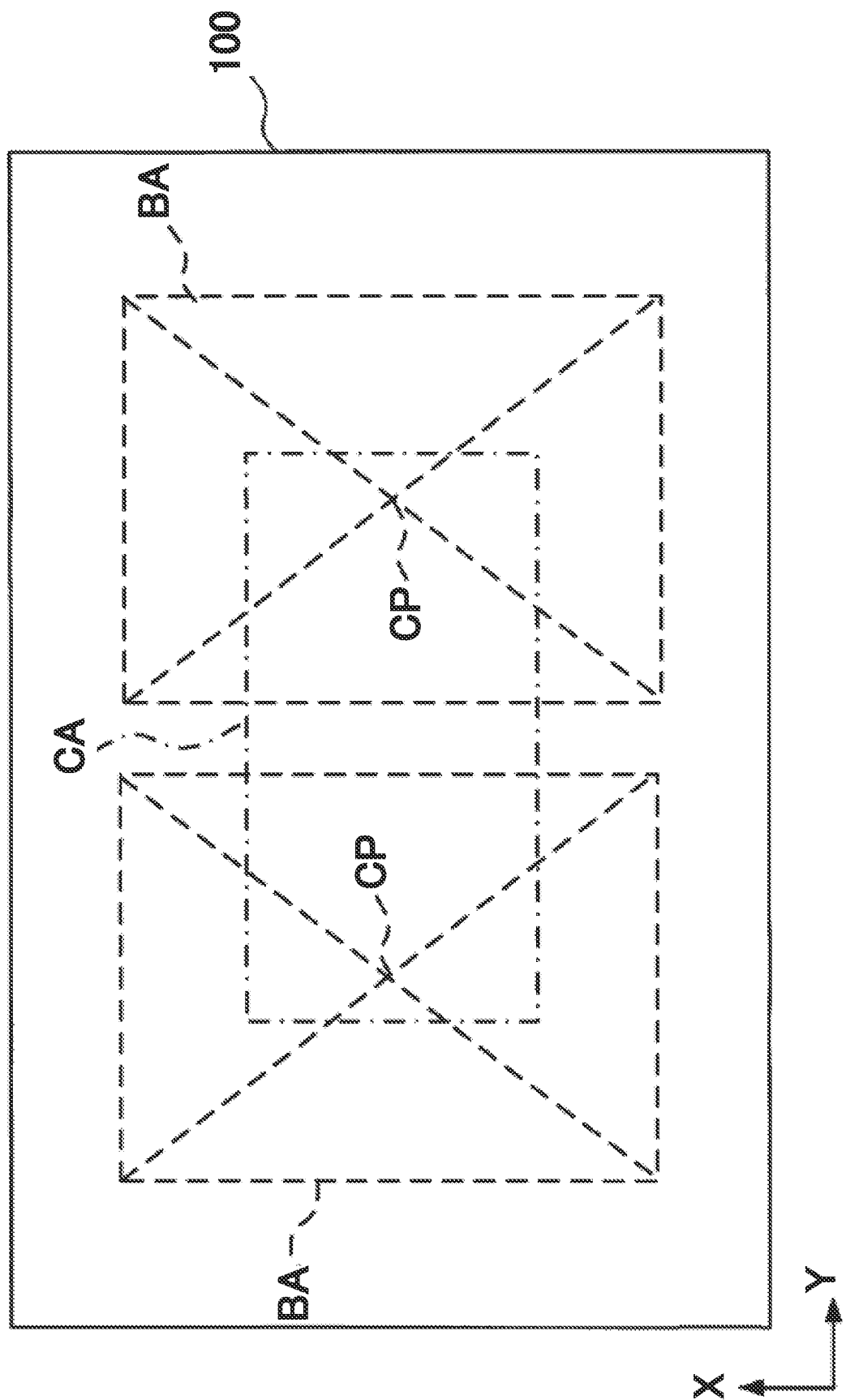
FIG. 13 is an explanatory diagram showing an example of a presence check region CA.

Next, the pad region extraction unit 814 sets a partial region in the image G2 as the presence check region CA (step S7: pad region extraction processing (A2)). In the example shown in FIG. 13, the rectangular presence check region CA is set near the center of the image G2. In FIG. 13, two pad regions BA are indicated by broken lines.

Next, the pad region extraction unit 814 obtains a geometric center CP of one or the plurality of pad regions BA (step S8: pad region extraction processing (A3)).

Next, among one or the plurality of pad regions BA, the pad region BA in which the geometric center CP is positioned in the presence check region CA is selected as a processing target (step S9: pad region extraction processing (A4)). In the example shown in FIG. 13, since the geometric centers CP of the two pad regions BA are both positioned in the presence check region CA, the two pad regions BA are selected as the processing targets.

According to step S9, by setting the presence check region CA in advance so as to include the geometric center CP of the pad region BA desired to be the processing target, it becomes easy to select, as the processing target, the pad region BA as intended.

Figure 5:
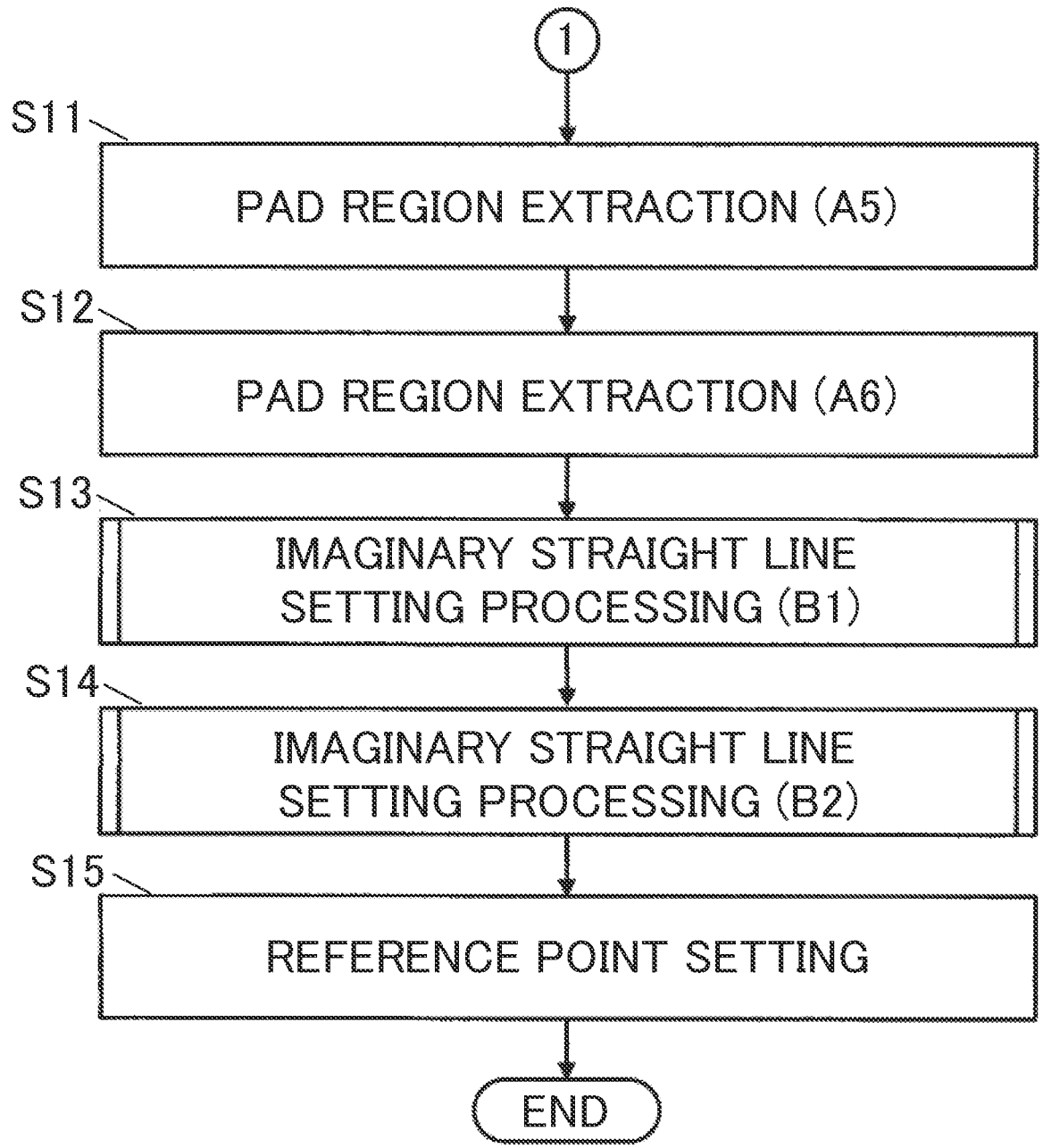
FIG. 5 is a flowchart showing an example of pad region extraction processing (A5) and (A6), imaginary straight line setting processing (B1) and (B2), and reference point setting processing.

Next, with reference to FIG. 5, the pad region extraction unit 814 excludes, from the processing target, the pad region BA where the geometric center CP is positioned outside the presence check region CA among one or the plurality of pad regions BA (step S11: pad region extraction processing (A5)). This allows the unintended pad region BA to be excluded from the processing target even when the unintended pad region BA is selected as the processing target in step S9.

Figure 14:
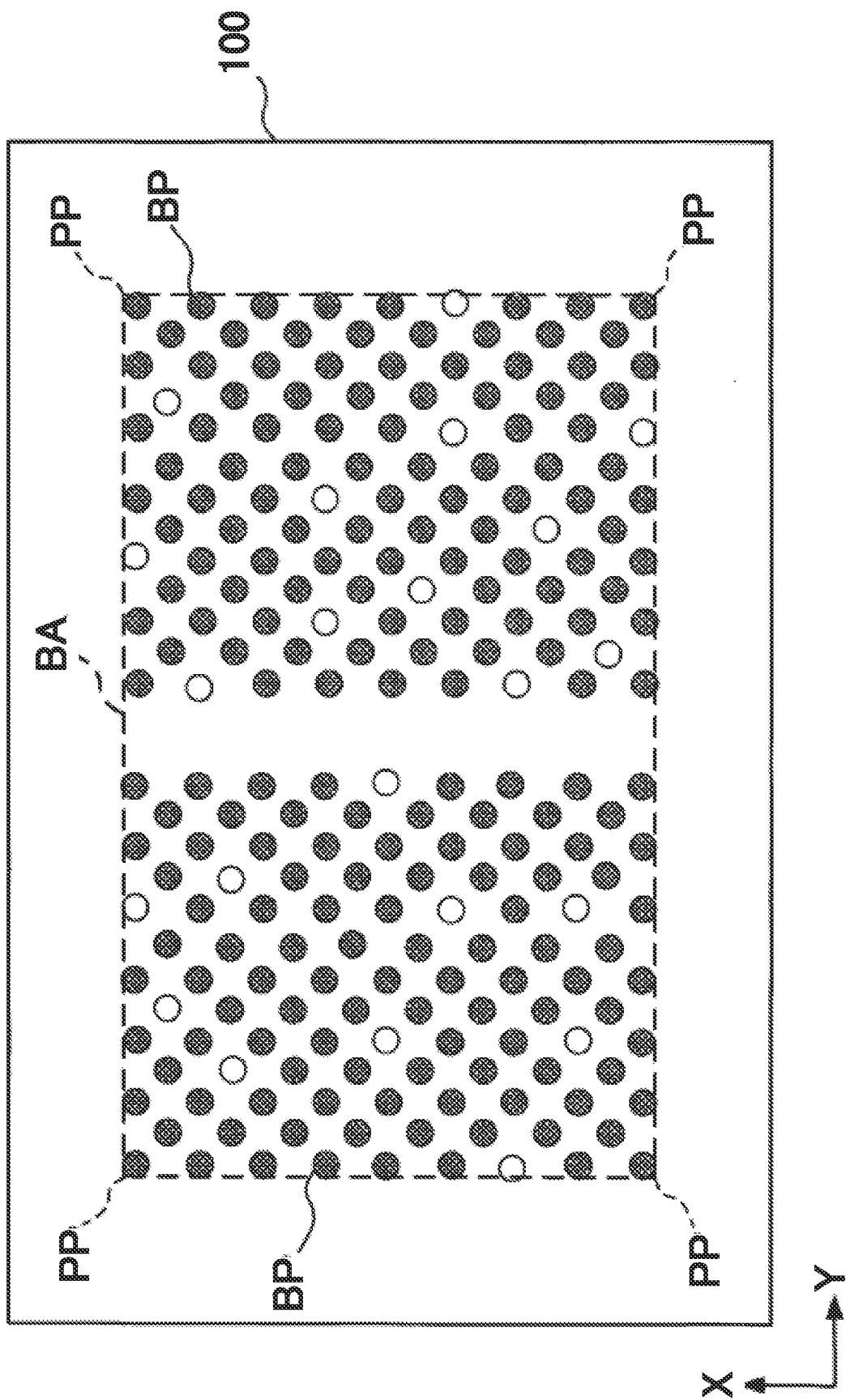
FIG. 14 is an explanatory diagram showing an example of a grouped pad region BA.

Next, the pad region extraction unit 814 groups the plurality of pad regions BA of the processing target into a single pad region BA (step S12: pad region extraction processing (A6)). As shown in FIG. 14, the plurality of pad regions BA are grouped into the single pad region BA including an interval part. As a method for grouping the plurality of pad regions BA into the single pad region BA, for example, morphology processing or a method of approximating and grouping with a rectangular shape set in advance can be used.

Before grouping, processing of removing noise such as dirt that is not a pad may be performed for each pad region BA. As a method for removing the noise in each pad region BA, various image processing methods can be used. For example, by repeating closing processing, opening processing in the X direction, and opening processing in the Y direction, it is possible to use a method for erasing the noise attached to the pad region BA in the X direction or the Y direction.

Note that, as the pad region extraction processing, the pad region extraction unit 814 only needs to be able to extract the pad region BA having a substantially rectangular shape surrounding the plurality of pad rows L from the image of the inspection target object 100 captured by the image-capturing unit 41, and the pad region extraction processing is not necessarily limited to the example of executing steps S7 to S12.

Next, the imaginary straight line setting unit 815 performs sorting from among the plurality of pads BP positioned at least near the outer edge in the grouped pad region BA (step S13: imaginary straight line setting processing (B1)).

Figure 15:
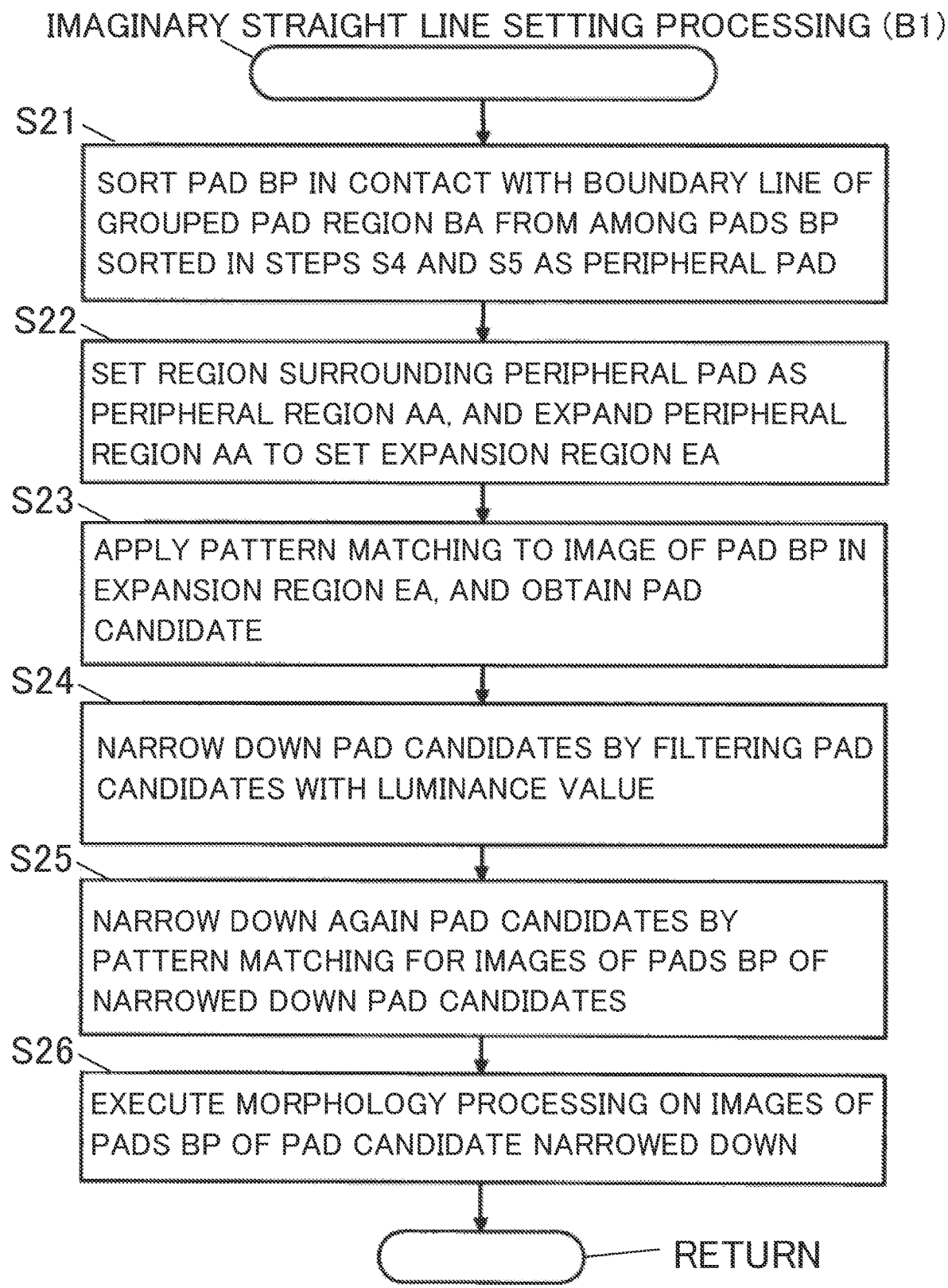
FIG. 15 is a flowchart showing an example of imaginary straight line setting processing (B1)
Figure 16:
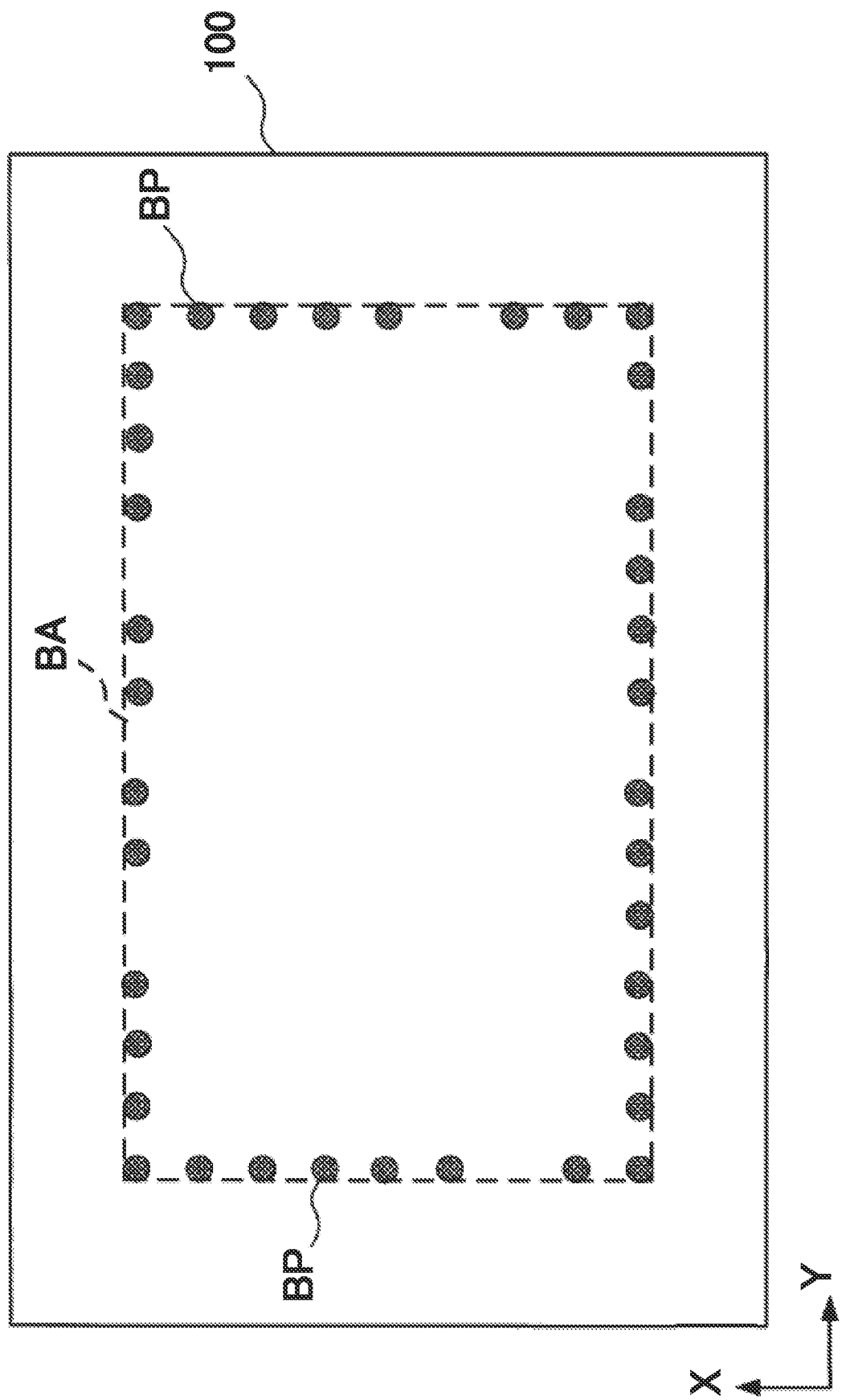
FIG. 16 is an explanatory view for explaining a method of sorting a peripheral pad.

With reference to FIG. 15, first, the imaginary straight line setting unit 815 sorts an image of the pad BP in contact with the boundary line of the grouped pad region BA from among the images of the pads BP sorted in steps S4 and S5 as a peripheral pad (step S21). Due to this, as shown in FIG. 16, the plurality of pads BP positioned at the outer edge of the grouped pad region BA are selected.

Figure 17:
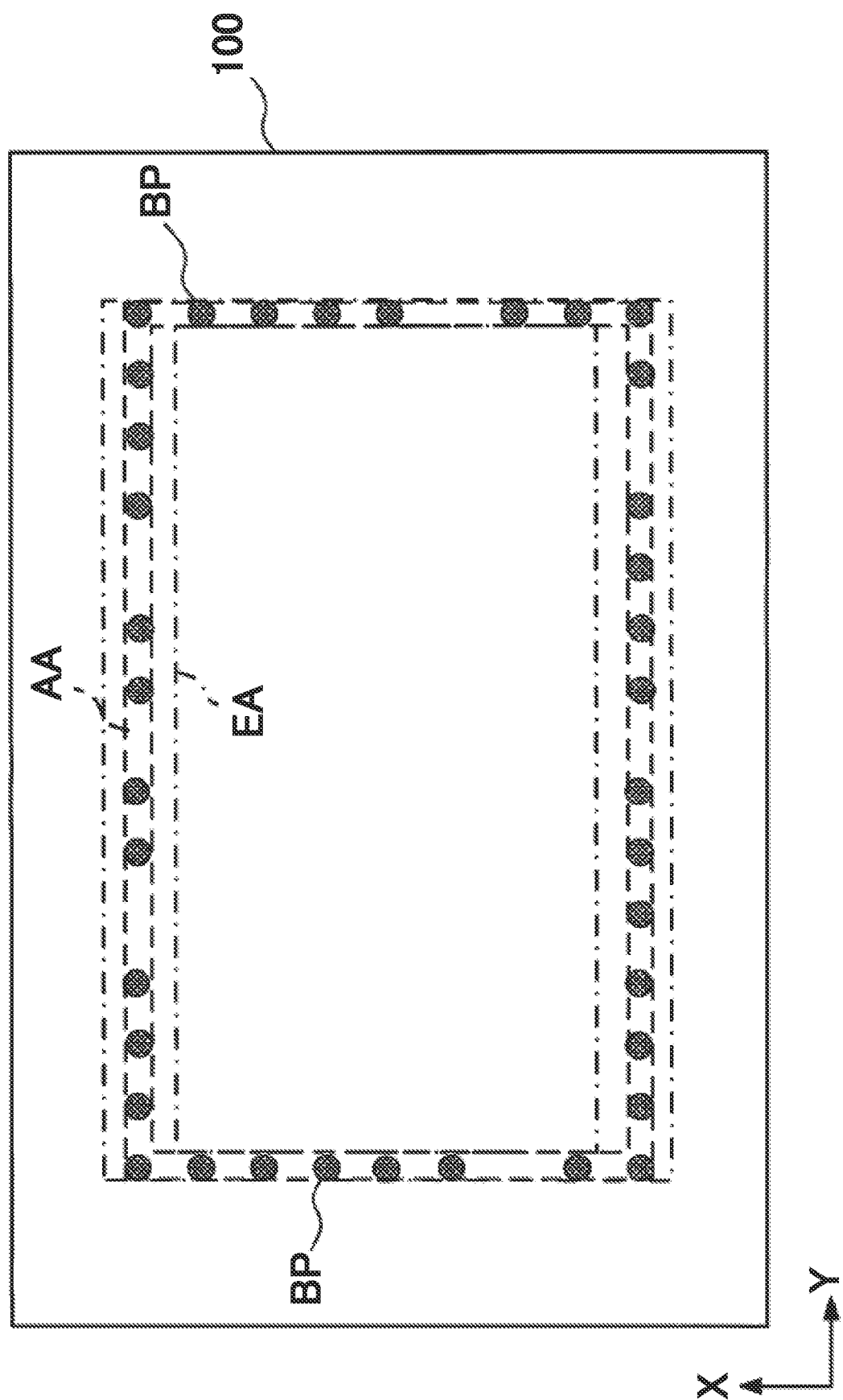
FIG. 17 is an explanatory diagram for explaining step S22.

With reference to FIG. 17, next, the imaginary straight line setting unit 815 sets a region surrounding the peripheral pad as a peripheral region AA, and expands the peripheral region AA by two rows of pads in the X direction to set an expansion region EA (step S22).

Figure 18:
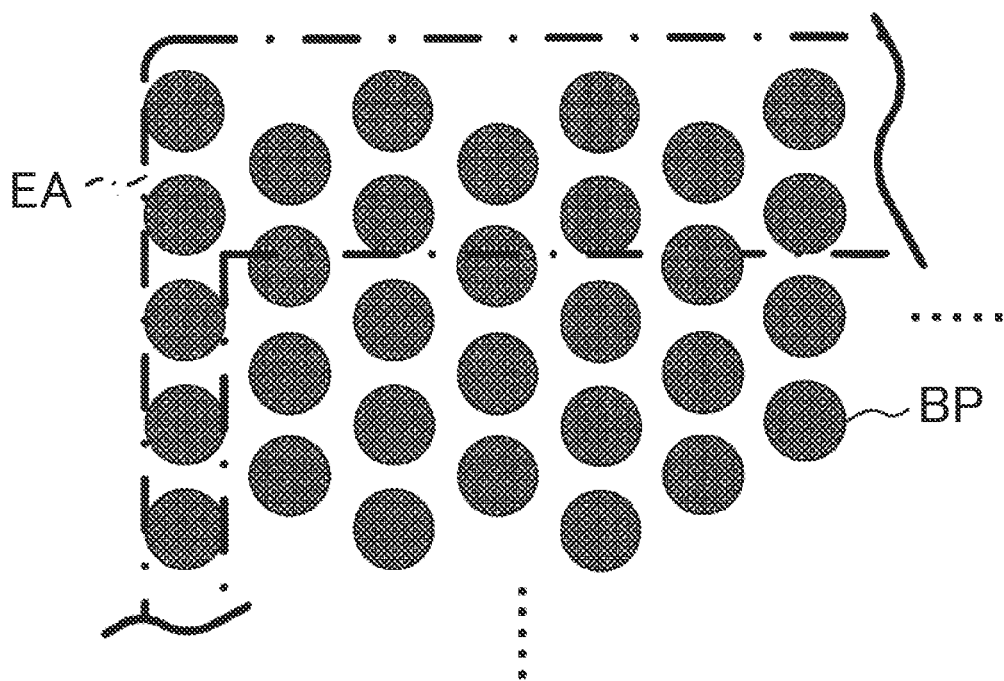
FIG. 18 is an explanatory diagram for explaining an expansion region EA in detail.

With reference to FIG. 18, the X direction is a direction along the pad row L, and the pads BP are linearly aligned in the X direction. On the other hand, the positions of the pads BP are shifted in the X direction between the adjacent pad rows L. Therefore, the peripheral region AA is expanded in the X direction to a width equivalent to two pads BP.

Note that the pad BP is not limited to the example in which the positions of the pads BP are shifted in the X direction between the adjacent pad rows L, and the peripheral region AA needs not be expanded by two rows of pads in the X direction. The imaginary straight line setting unit 815 may expand the peripheral region AA in the Y direction or in both the X and Y directions.

The number of rows in which the peripheral region AA is expanded is not limited to two, and the peripheral region AA may be expanded by any number of plurality of rows. While the example in which the expansion region EA is set to include the peripheral pad has been described, the expansion region EA needs not include the peripheral pad. The expansion region EA may be set in the pad region BA inside relative to the peripheral pad.

Due to this, in the imaginary straight line setting processing (B1), it is possible to sort, from among the pads BP by a plurality of rows, at least one of the pad rows arranged side by side in the X direction and the pad rows arranged side by side in the Y direction.

Next, the imaginary straight line setting unit 815 applies, to the image of the pad BP in the expansion region EA, pattern matching for the reference image of the pad BP set in advance, and obtains pad candidates for obtaining the imaginary straight line (step S23).

Figure 19:
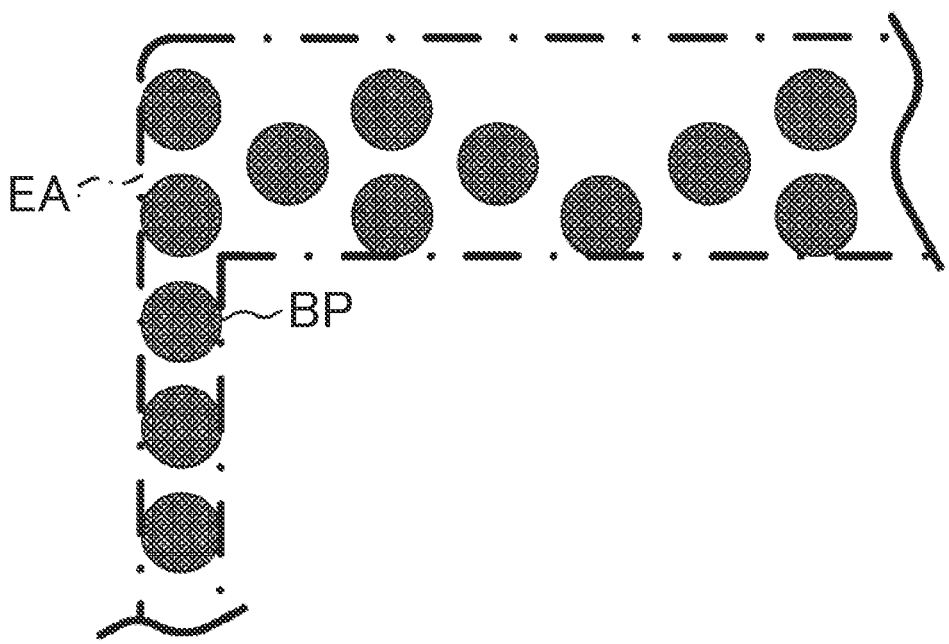
FIG. 19 is an explanatory diagram showing an example of a pad candidate.

Next, the imaginary straight line setting unit 815 narrows down the pad candidates by filtering, with the luminance value, the pad candidates obtained in step S23 (step S24). This gives the pad candidate as shown in FIG. 19, for example. Even when dirt having a shape similar to that of the pad BP is erroneously recognized in the pattern matching in step S23, it becomes easy to eliminate erroneous recognition due to the pattern matching by further performing filtering with the luminance value.

Next, the imaginary straight line setting unit 815 narrows down again the pad candidates by pattern matching using a parameter different from that in step S23 for the images of the pads BP of the narrowed down pad candidates (step S25). This makes it easy to reduce the risk that a wrong image of the pad BP due to erroneous recognition is included in the pad candidate.

Next, the imaginary straight line setting unit 815 executes the morphology processing on the images of the pads BP of the pad candidate narrowed down in step S25 (step S26). This makes it easy to reduce the risk that dirt or the like having the same size as that of the pad BP is included in the pad candidate due to erroneous recognition.

In the imaginary straight line setting processing (B1), the number of pad candidates arranged side by side in the X direction and the number of pad candidates arranged side by side in the Y direction are preferably three or more in the end. Due to this, in the imaginary straight line setting processing (B2), the number of pads used for setting of the first straight line VL1 is three or more, and the number of pads used for setting of the second straight line VL2 is three or more. As a result, it becomes easy to improve the setting accuracy of the first straight line VL1 and the second straight line VL2.

Next, the imaginary straight line setting unit 815 sets the first straight line VL1 and the second straight line VL2 based on the image of the pad BP sorted in steps S21 to S26 and set as the pad candidate (step S14: imaginary straight line setting processing (B2)).

Figure 20:
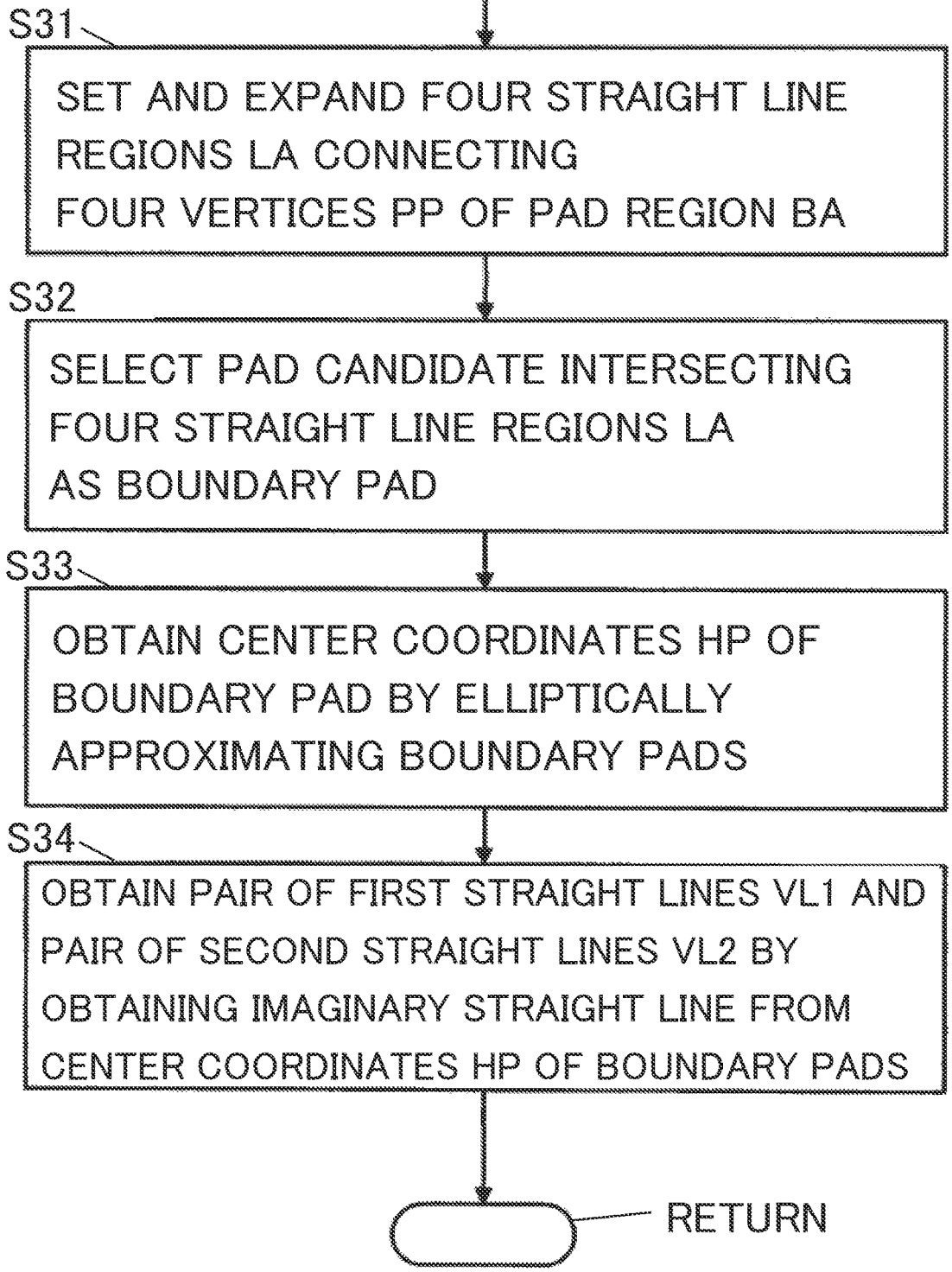
FIG. 20 is a flowchart showing an example of imaginary straight line setting processing (B2)
Figure 21:
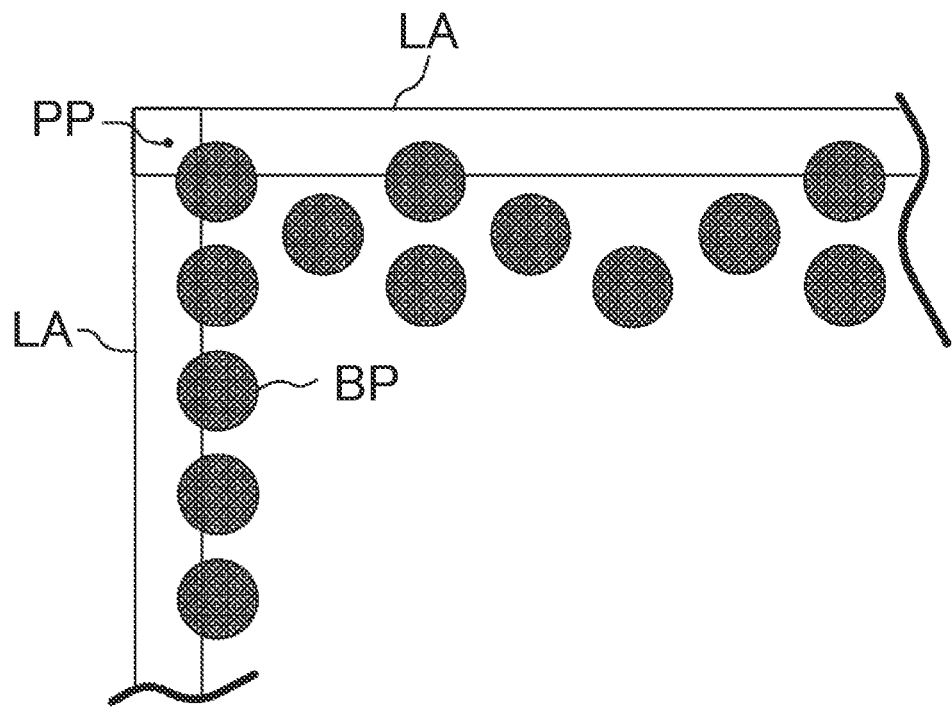
FIG. 21 is an explanatory diagram showing an example of a straight line region LA expanded in step S31.

With reference to FIG. 20, the imaginary straight line setting unit 815 sets and expands four straight line regions LA connecting four vertices PP (see FIG. 14) of the pad region BA (step S31: FIG. 21).

In the imaginary straight line setting processing (B1), when the pad candidate is sorted from the expansion region EA set in the pad region BA inside relative to the peripheral pad, the widths of the four straight line regions LA are expanded so as to have a width overlapping the region where the pad candidates are positioned.

Figure 22:
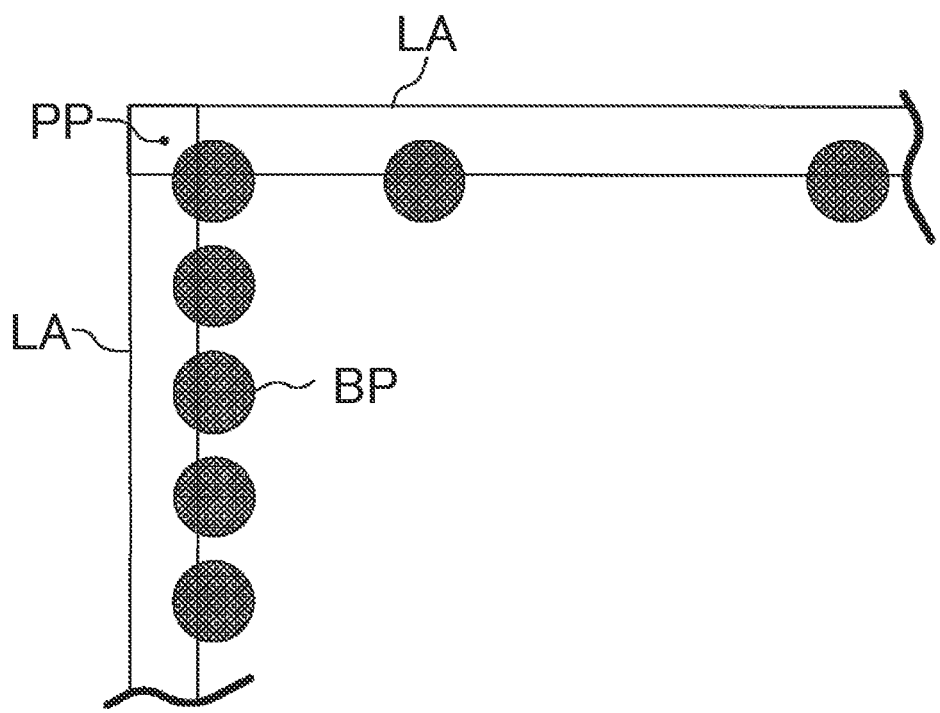
FIG. 22 is an explanatory diagram showing an example of a pad candidate selected as a boundary pad.

Next, the imaginary straight line setting unit 815 selects, as a boundary pad, the pad candidate intersecting the four straight line regions LA from among the pad candidates sorted in the imaginary straight line setting processing (B1) in step S13 (step S32). FIG. 22 shows only an image of the pad BP selected as the boundary pad based on the straight line region LA shown in FIG. 21.

Next, the imaginary straight line setting unit 815 obtains center coordinates HP of each boundary pad by elliptically approximating the images of the plurality of pads BP selected as the boundary pads in step S32 (step S33). By obtaining the center coordinates HP by elliptical approximation, the center coordinates HP of each boundary pad can be easily obtained even when the image of the pad BP is slightly deformed from a true circle.

Figure 23:
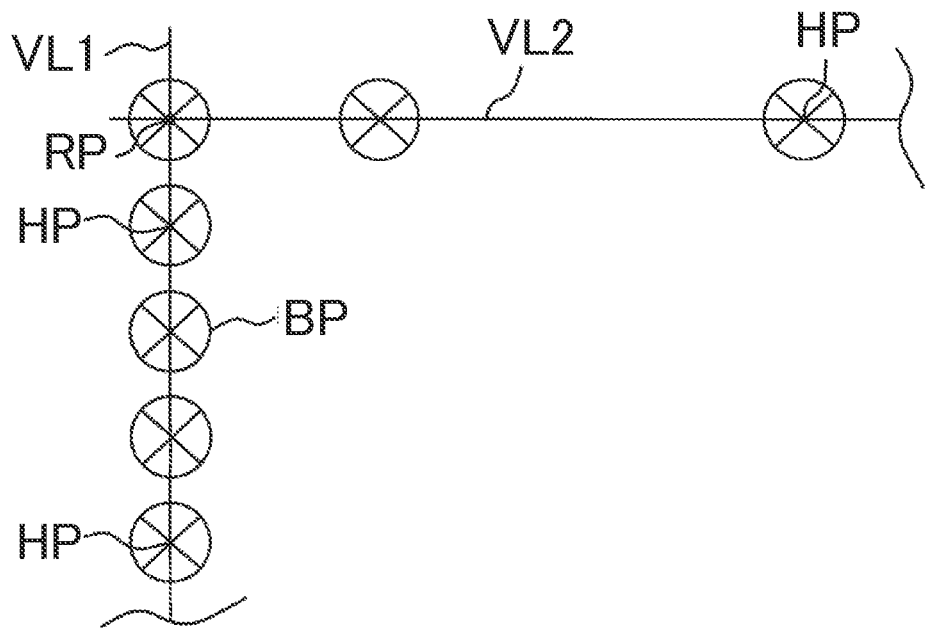
FIG. 23 is an explanatory diagram showing an example of a first straight line VL1, a second straight line VL2, and a reference point RP.

Next, the imaginary straight line setting unit 815 obtains a pair of first straight lines VL1 and a pair of second straight lines VL2 by obtaining an imaginary straight line from the center coordinates HP of the plurality of boundary pads (step S34: FIG. 23). As an example of a method for obtaining the imaginary straight line from the center coordinates HP of the plurality of boundary pads, for example, a straight line passing through each of the center coordinates HP may be used as the imaginary straight line, for example, the imaginary straight line may be obtained by linearly approximating each of the center coordinates HP, or the imaginary straight line may be obtained by another method.

The imaginary straight line setting unit 815 only needs to be able to obtain the first straight line VL1 and the second straight line VL2 extending along the boundary pad, and the method for obtaining the first straight line VL1 and the second straight line VL2 is not limited. As the imaginary straight line setting processing, the imaginary straight line setting unit 815 only needs to be able to set the imaginary first straight line VL1 along the side extending in the X direction of the pad region BA and set the imaginary second straight line VL2 along the side extending in the Y direction, and does not necessarily have to execute steps S13 and S14. The first straight line VL1 and the second straight line VL2 need not be along the side of the pad region BA. The first straight line VL1 only needs to extend in parallel with the side of the pad region BA extending in the X direction, and the second straight line VL2 needs to extend in parallel with the side of the pad region BA extending in the Y direction.

Figure 24:
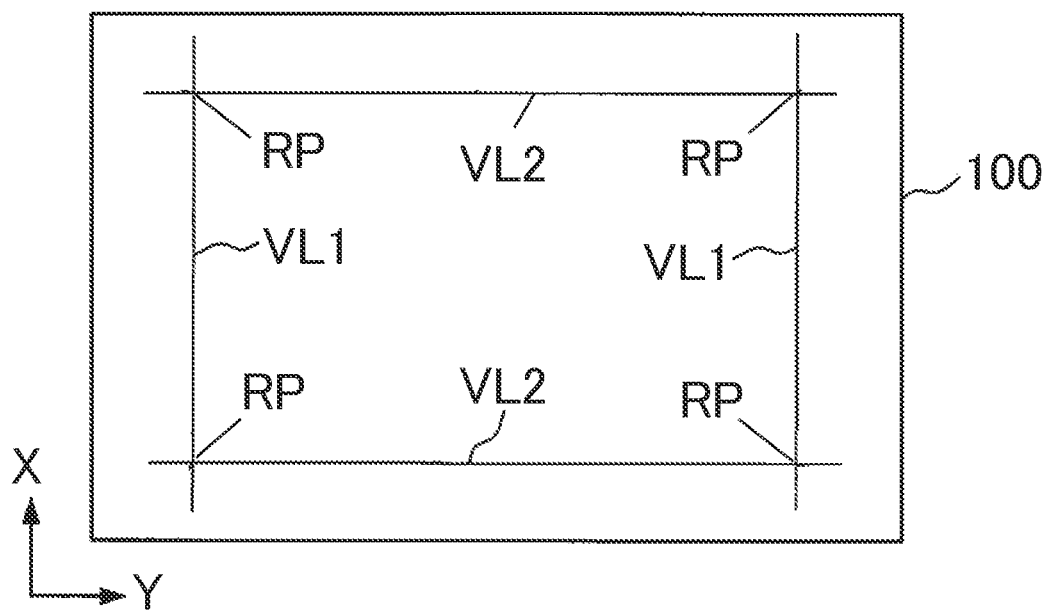
FIG. 24 is an explanatory diagram showing an example of a state in which the reference point RP is set in the inspection target object 100.

Next, as shown in FIG. 23, the imaginary straight line setting unit 815 sets the intersection of the first straight line VL1 and the second straight line VL2 as the reference point RP (step S15: reference point setting processing). According to the example shown in FIG. 23, four reference points RP can be set for four intersections where the pair of first straight lines VL1 and the pair of second straight lines VL2 intersect, as shown in FIG. 24.

Due to this, as described above, based on the reference point RP set by the reference point setting unit 816, the inspection processing unit 82 can position the inspection jig 3 with respect to the inspection target object 100 and inspect the inspection target object 100.

As described above, according to the processing of steps S1 to S15, since the reference point RP can be set based on the image of the pad BP that is an inspection target with respect to the inspection target object 100 in which the pad arrangement has become dense, it is possible to facilitate the positioning with respect to the inspection target object in which the pad arrangement has become dense.

That is, an image processing apparatus according to one example of the present disclosure is an image processing apparatus that sets a positioning reference point with respect to an inspection target object in which a plurality of pad rows in which a plurality of pads line up along a first direction are formed side by side in a second direction intersecting the first direction, the image processing apparatus including: a pad region extraction unit that executes pad region extraction processing of extracting a substantially rectangular pad region surrounding the plurality of pads from an image of the inspection target object; an imaginary straight line setting unit that executes imaginary straight line setting processing of setting an imaginary first straight line parallel to a side extending in the first direction of the pad region and setting an imaginary second straight line parallel to a side extending in the second direction; and a reference point setting unit that executes reference point setting processing of setting an intersection between the first straight line and the second straight line as the reference point.

An inspection apparatus according to one example of the present disclosure positions the inspection target object using the reference point set by the above-described image processing apparatus.

An image processing method according to one example of the present disclosure is an image processing method for setting a positioning reference point with respect to an inspection target object in which a plurality of pad rows in which a plurality of pads line up along a first direction are formed side by side in a second direction intersecting the first direction, the image processing method including: pad region extraction processing of extracting a substantially rectangular pad region surrounding the plurality of pad rows from an image of the inspection target object; imaginary straight line setting processing of setting an imaginary first straight line parallel to a side extending in the first direction of the pad region and setting an imaginary second straight line parallel to a side extending in the second direction; and reference point setting processing of setting an intersection between the first straight line and the second straight line as the reference point.

According to these configurations, since the reference point for positioning can be set based on the image of the pad provided on the substrate, it is possible to facilitate the positioning with respect to the substrate not having a mark for no positioning.

It is preferable that the imaginary straight line setting processing includes (B1) a step of performing sorting from among the plurality of pads positioned at least near the outer edge in the pad region, and (B2) a step of setting the first straight line and the second straight line based on the pad sorted in the step (B1).

According to this configuration, the first straight line parallel to the side extending in the first direction of the pad region and the second straight line parallel to the side extending in the second direction of the pad region are set based on the image of the pad sorted from among the plurality of pads positioned near the outer edge of the pad region. Therefore, it becomes easy to set the first straight line and the second straight line.

In the imaginary straight line setting processing, it is preferable that the number of pads used for setting of the first straight line is three or more, and the number of pads used for setting of the second straight line is three or more.

According to this configuration, the first straight line and the second straight line can each be set from three or more pad images. As a result, it becomes easy to improve the setting accuracy of the first straight line and the second straight line.

It is preferable that the pad region is singular or plural, the pad region extraction processing includes (A1) a step of extracting one or a plurality of the pad regions from an image of the substrate, (A2) a step of setting a partial region in the image as a presence check region, (A3) a step of obtaining each geometric center of the one or plurality of pad regions, and (A4) a step of selecting, as a processing target, the pad region where the geometric center is positioned in the presence check region, from among the one or plurality of pad regions, and the imaginary straight line setting processing sets the first straight line and the second straight line with respect to a pad region selected as the processing target.

This configuration allows the pad region that is a processing target to be easily extracted from among one or a plurality of pad regions provided on the substrate.

It is preferable that the pad region extraction processing includes (A5) a step of excluding, from a processing target, the pad region of which the geometric center is positioned outside the presence check region from among the one or plurality of pad regions.

According to this configuration, since the pad region positioned outside the presence check region can be excluded from the processing target, the processing amount can be easily reduced.

It is preferable to further include a binarization unit that executes binarization processing of binarizing an image of the inspection target object, and that at least one of the pad region extraction processing, the imaginary straight line setting processing, and the reference point setting processing is executed based on the image having been binarized.

According to this configuration, since the contrast of the image can be enhanced by binarizing the image of the substrate, at least one image processing of the pad region extraction processing, the imaginary straight line setting processing, and the reference point setting processing is facilitated.

It is preferable to further include a noise reduction unit that executes noise reduction processing of reducing noise near a center portion in an image of the pad, and that at least one of the pad region extraction processing, the imaginary straight line setting processing, and the reference point setting processing is executed based on an image of the pad where the noise is reduced.

According to this configuration, since noise due to the illumination light reflected near the top of the pad can be reduced, at least one image processing of the pad region extraction processing, the imaginary straight line setting processing, and the reference point setting processing is facilitated.

It is preferable to further include a sorting unit that executes sorting processing of sorting images of the plurality of pads by pattern matching, and that at least one of the pad region extraction processing, the imaginary straight line setting processing, and the reference point setting processing is executed based on an image of the pad sorted by the sorting processing.

According to this configuration, since at least one of the pad region extraction processing, the imaginary straight line setting processing, and the reference point setting processing is executed based on an image of the pad sorted by pattern matching, it is easy to improve the processing accuracy by at least one of the pad region extraction processing, the imaginary straight line setting processing, and the reference point setting processing.

It is preferable that the step (B2) is to set the first straight line and the second straight line by obtaining an imaginary straight line based on a pad sorted in the step (B1).

This configuration makes it easy to improve the setting accuracy of the first straight line and the second straight line.

It is preferable that the (B1) step is to perform sorting, from among the pads by a plurality of rows, at least one of the pad row and a pad row arranged side by side in the second direction.

This configuration makes it possible to set at least one of the first straight line and the second straight line based on the pad sorted from the pads by a plurality of rows. Therefore, even when there is a pad in which the image is difficult to recognize, it becomes easy to set at least one of the first straight line and the second straight line from another pad.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

FIG. 1
  8 INSPECTION UNIT
FIG. 2
  3 INSPECTION JIG
    PROBE P
    PROBE P
    PROBE P
  41 IMAGE-CAPTURING UNIT
  80 CONTROL UNIT
  81 IMAGE PROCESSING UNIT
  82 INSPECTION PROCESSING UNIT
  801 DRIVE MECHANISM
  802 MEASUREMENT UNIT
  803 SCANNER UNIT
  811 BINARIZATION UNIT
  812 SORTING UNIT
  813 NOISE REDUCTION UNIT
  814 PAD REGION EXTRACTION UNIT
  815 IMAGINARY STRAIGHT LINE SETTING UNIT
  816 REFERENCE POINT SETTING UNIT
FIG. 4
  START
  S1 NOISE REDUCTION PROCESSING
  S2 BINARIZATION PROCESSING

S3 NARROWING DOWN PROCESSING
S4 SORTING PROCESSING 1
S5 SORTING PROCESSING 2
S6 PAD REGION EXTRACTION PROCESSING (A1)
S7 PAD REGION EXTRACTION PROCESSING (A2)
S8 PAD REGION EXTRACTION PROCESSING (A3)
S9 PAD REGION EXTRACTION PROCESSING (A4)
FIG. 5
S11 PAD REGION EXTRACTION PROCESSING (A5)
S12 PAD REGION EXTRACTION PROCESSING (A6)
S13 IMAGINARY STRAIGHT LINE SETTING PROCESSING (B1)
S14 IMAGINARY STRAIGHT LINE SETTING PROCESSING (B2)
S15 REFERENCE POINT SETTING PROCESSING
END
FIG. 15
IMAGINARY STRAIGHT LINE SETTING PROCESSING (B1)
S21 SORT PAD BP IN CONTACT WITH BOUNDARY LINE OF GROUPED PAD REGION BA FROM AMONG PADS BP SORTED IN STEPS S4 AND S5 AS PERIPHERAL PAD
S22 SET REGION SURROUNDING PERIPHERAL PAD AS PERIPHERAL REGION AA, AND EXPAND PERIPHERAL REGION AA BY TWO ROWS OF PADS IN X DIRECTION TO SET EXPANSION REGION EA
S23 APPLY PATTERN MATCHING TO IMAGE OF PAD BP IN EXPANSION REGION EA, AND OBTAIN PAD CANDIDATE
S24 NARROW DOWN PAD CANDIDATES BY FILTERING PAD CANDIDATES WITH LUMINANCE VALUE
S25 NARROW DOWN AGAIN PAD CANDIDATES BY PATTERN MATCHING USING PARAMETER DIFFERENT FROM THAT IN STEP S23 FOR IMAGES OF PADS BP OF NARROWED DOWN PAD CANDIDATES
S26 EXECUTE MORPHOLOGY PROCESSING ON IMAGES OF PADS BP OF PAD CANDIDATE NARROWED DOWN IN STEP S25
RETURN
FIG. 20
IMAGINARY STRAIGHT LINE SETTING PROCESSING (B2)
S31 SET AND EXPAND FOUR STRAIGHT LINE REGIONS LA CONNECTING FOUR VERTICES PP OF PAD REGION BA
S32 SELECT PAD CANDIDATE INTERSECTING FOUR STRAIGHT LINE REGIONS LA AS BOUNDARY PAD
S33 OBTAIN CENTER COORDINATES HP OF BOUNDARY PAD BY ELLIPTICALLY APPROXIMATING BOUNDARY PADS
S34 OBTAIN PAIR OF FIRST STRAIGHT LINES VL1 AND PAIR OF SECOND STRAIGHT LINES VL2 BY OBTAINING IMAGINARY STRAIGHT LINE FROM CENTER COORDINATES HP OF BOUNDARY PADS
RETURN

What is claimed is:

1. An image processing apparatus that sets a positioning reference point with respect to an inspection target object in which a plurality of pad rows in which a plurality of pads line up along a first direction are formed side by side in a second direction intersecting the first direction, the image processing apparatus comprising:
a pad region extraction unit that executes pad region extraction processing of extracting a substantially rectangular pad region surrounding the plurality of pads from an image of the inspection target object;
an imaginary straight line setting unit that executes imaginary straight line setting processing of setting an imaginary first straight line parallel to a side extending in the first direction of the pad region and setting an imaginary second straight line parallel to a side extending in the second direction; and
a reference point setting unit that executes reference point setting processing of setting an intersection between the first straight line and the second straight line as the reference point.

2. The image processing apparatus according to claim 1, wherein
the imaginary straight line setting processing includes
(B1) a step of performing sorting from among the plurality of pads positioned at least near an outer edge in the pad region, and
(B2) a step of setting the first straight line and the second straight line based on a pad sorted in the step (B1).

3. The image processing apparatus according to claim 2, wherein the step (B2) is to set the first straight line and the second straight line by obtaining an imaginary straight line based on a pad sorted in the step (B1).

4. The image processing apparatus according to claim 2, wherein the (B1) step is to perform sorting, from among the pads by a plurality of rows, at least one of the pad row and a pad row arranged side by side in the second direction.

5. The image processing apparatus according to claim 2, wherein in the imaginary straight line setting processing, a number of pads used for setting of the first straight line is three or more, and a number of pads used for setting of the second straight line is three or more.

6. The image processing apparatus according to claim 2, wherein
the pad region is singular or plural,
the pad region extraction processing includes
(A1) a step of extracting one or a plurality of the pad regions from an image of the inspection target object,
(A2) a step of setting a partial region in the image as a presence check region,
(A3) a step of obtaining each geometric center of the one or plurality of pad regions, and
(A4) a step of selecting, as a processing target, the pad region where the geometric center is positioned in the presence check region, from among the one or plurality of pad regions, and
the imaginary straight line setting processing sets the first straight line and the second straight line with respect to a pad region selected as the processing target.

7. The image processing apparatus according to claim 6, wherein
the pad region extraction processing includes
(A5) a step of excluding, from a processing target, the pad region of which the geometric center is positioned outside the presence check region from among the one or plurality of pad regions.

8. The image processing apparatus according to claim 2 further comprising
a binarization unit that executes binarization processing of binarizing an image of the inspection target object, wherein at least one of the pad region extraction processing, the imaginary straight line setting processing, and the reference point setting processing is executed based on the image having been binarized.

9. The image processing apparatus according to claim 2 further comprising
a noise reduction unit that executes noise reduction processing of reducing noise near a center portion in an image of the pad, wherein
at least one of the pad region extraction processing, the imaginary straight line setting processing, and the reference point setting processing is executed based on an image of the pad where the noise is reduced.

10. The image processing apparatus according to claim 2 further comprising
a sorting unit that executes sorting processing of sorting images of the plurality of pads by pattern matching, wherein
at least one of the pad region extraction processing, the imaginary straight line setting processing, and the reference point setting processing is executed based on an image of the pad sorted by the sorting processing.

11. An inspection apparatus that positions the inspection target object using the reference point set by the image processing apparatus according to claim 2.

12. The image processing apparatus according to claim 1, wherein in the imaginary straight line setting processing, a number of pads used for setting of the first straight line is three or more, and a number of pads used for setting of the second straight line is three or more.

13. The image processing apparatus according to claim 1, wherein
the pad region is singular or plural,
the pad region extraction processing includes
(A1) a step of extracting one or a plurality of the pad regions from an image of the inspection target object,
(A2) a step of setting a partial region in the image as a presence check region,
(A3) a step of obtaining each geometric center of the one or plurality of pad regions, and
(A4) a step of selecting, as a processing target, the pad region where the geometric center is positioned in the presence check region, from among the one or plurality of pad regions, and
the imaginary straight line setting processing sets the first straight line and the second straight line with respect to a pad region selected as the processing target.

14. The image processing apparatus according to claim 13, wherein
the pad region extraction processing includes
(A5) a step of excluding, from a processing target, the pad region of which the geometric center is positioned outside the presence check region from among the one or plurality of pad regions.

15. The image processing apparatus according to claim 1 further comprising
a binarization unit that executes binarization processing of binarizing an image of the inspection target object, wherein
at least one of the pad region extraction processing, the imaginary straight line setting processing, and the reference point setting processing is executed based on the image having been binarized.

16. The image processing apparatus according to claim 1 further comprising
a noise reduction unit that executes noise reduction processing of reducing noise near a center portion in an image of the pad, wherein
at least one of the pad region extraction processing, the imaginary straight line setting processing, and the reference point setting processing is executed based on an image of the pad where the noise is reduced.

17. The image processing apparatus according to claim 1 further comprising
a sorting unit that executes sorting processing of sorting images of the plurality of pads by pattern matching, wherein
at least one of the pad region extraction processing, the imaginary straight line setting processing, and the reference point setting processing is executed based on an image of the pad sorted by the sorting processing.

18. An inspection apparatus that positions the inspection target object using the reference point set by the image processing apparatus according to claim 1.

19. An image processing method for setting a positioning reference point with respect to an inspection target object in which a plurality of pad rows in which a plurality of pads line up along a first direction are formed side by side in a second direction intersecting the first direction, the image processing method comprising:
pad region extraction processing of extracting a substantially rectangular pad region surrounding the plurality of pad rows from an image of the inspection target object;
imaginary straight line setting processing of setting an imaginary first straight line parallel to a side extending in the first direction of the pad region and setting an imaginary second straight line parallel to a side extending in the second direction; and
reference point setting processing of setting an intersection between the first straight line and the second straight line as the reference point.

* * * * *